United States Patent
Sugaya et al.

(10) Patent No.: US 8,085,744 B2
(45) Date of Patent: Dec. 27, 2011

(54) WIRELESS COMMUNICATION SYSTEM, WIRELESS COMMUNICATION APPARATUS, WIRELESS COMMUNICATION METHOD, AND COMPUTE PROGRAM

(75) Inventors: Shigeru Sugaya, Kanagawa (JP); Shin Saito, Kanagawa (JP); Kazuyuki Sakoda, Tokyo (JP)

(73) Assignee: Sony Corporation (JP)

( * ) Notice: Subject to any disclaimer, the term of this patent is extended or adjusted under 35 U.S.C. 154(b) by 834 days.

(21) Appl. No.: 12/150,492

(22) Filed: Apr. 29, 2008

(65) Prior Publication Data

US 2008/0212547 A1    Sep. 4, 2008

Related U.S. Application Data

(62) Division of application No. 10/510,011, filed as application No. PCT/JP2004/006101 on Apr. 27, 2004, now Pat. No. 7,630,334.

(30) Foreign Application Priority Data

May 7, 2003    (JP) ................................. P2003-129546

(51) Int. Cl.
*H04W 4/00*    (2009.01)
(52) U.S. Cl. ..................................... 370/338; 370/395.42
(58) Field of Classification Search .................. 370/338, 370/236, 395.42, 445, 447, 468, 477
See application file for complete search history.

(56) References Cited

U.S. PATENT DOCUMENTS

| 6,198,728 | B1 | 3/2001 | Hulyalkar et al. |
| 6,404,756 | B1 * | 6/2002 | Whitehill et al. ............ 370/338 |
| 6,490,256 | B1 | 12/2002 | Jones et al. |
| 6,678,252 | B1 | 1/2004 | Cansever |
| 6,788,702 | B1 * | 9/2004 | Garcia-Luna-Aceves et al. ............................. 370/458 |
| 7,016,372 | B2 * | 3/2006 | Haartsen ....................... 370/461 |
| 7,110,380 | B2 | 9/2006 | Shvodian |
| 7,117,008 | B2 * | 10/2006 | Bajikar ..................... 455/552.1 |
| 7,233,804 | B2 | 6/2007 | Sugaya et al. |
| 7,302,227 | B2 | 11/2007 | Sakoda |
| 7,489,651 | B2 | 2/2009 | Sugaya et al. |
| 2002/0049040 | A1 | 4/2002 | Sugaya et al. |
| 2002/0071413 | A1 * | 6/2002 | Choi ............................. 370/337 |

(Continued)

FOREIGN PATENT DOCUMENTS

EP    1387596 A1    2/2004

(Continued)

OTHER PUBLICATIONS

Supplementary European Search Report, EP 04729762, dated Jul. 20, 2010.

(Continued)

*Primary Examiner* — Brian Nguyen
(74) *Attorney, Agent, or Firm* — Lerner, David, Littenberg, Krumholz & Mentlik, LLP

(57) ABSTRACT

A wireless communication network that forms an ad-hoc network without the arrangement of a controlling station sets a period that a communication apparatus can utilize with priority and performs isochronous communication in the period as required. When isochronous communication has not been performed or after isochronous communication has finished in the priority utilization period, other communication apparatuses perform arbitrary communication. When another communication is performed in a communication apparatus's own priority utilization period, the start of isochronous communication is temporarily delayed. In an ad-hoc communication environment, data having a real-time characteristic, such as AV content, can be efficiently transmitted through the isochronous communication.

25 Claims, 21 Drawing Sheets

U.S. PATENT DOCUMENTS

| | | | |
|---|---|---|---|
| 2002/0126692 A1* | 9/2002 | Haartsen | 370/450 |
| 2003/0219001 A1* | 11/2003 | de Prado Pavon et al. | 370/338 |
| 2004/0043780 A1 | 3/2004 | Sugaya et al. | |
| 2004/0223477 A1* | 11/2004 | Iwasaki et al. | 370/338 |
| 2005/0276243 A1 | 12/2005 | Sugaya et al. | |
| 2007/0165589 A1 | 7/2007 | Sakoda | |
| 2008/0212547 A1 | 9/2008 | Sugaya et al. | |

FOREIGN PATENT DOCUMENTS

| | | |
|---|---|---|
| JP | 1-136435 | 5/1989 |
| JP | 11-252090 A | 9/1999 |
| JP | 2000-507790 T | 6/2000 |
| JP | 2001-345809 | 12/2001 |
| JP | 2002-051050 | 2/2002 |
| JP | 2003-229869 | 8/2003 |
| WO | 02/091788 A1 | 11/2002 |

OTHER PUBLICATIONS

Jeyhan Karaoguzkaraoguz: "High-Rate Wireless Personal Area Networks" IEEE Communications Magazine. IEEE Service Center. Piscataway. US. vo 1. 39. No. 12. Dec. 1, 2001. pp. 96-102. XPOII091866.

Gubbi, R., isochronous services in home multimedia networks, IEEE 1999 0-7803-5582-2/99, pp. 534-539.

* cited by examiner

FIG. 10

| Type | Length | MAC Address | Timing | Network ID | CRC | Utilization Recognition Slot Information | CRC |

FIG. 11

| Type | Length | Receiving-end Address | Transmitting-end Address | Command | CRC | Request Slot Information | CRC |

FIG. 12

| Type | Length | Receiving-end Address | Transmitting-end Address | Command | CRC | Utilization Slot Information | CRC |

FIG. 13

| Type | Length | Receiving-end Address | Transmitting-end Address | Command | CRC | Utilization Slot Information | CRC |

FIG. 14

| Type | Length | MAC Address | Timing | Network ID | CRC |

| Type | Length | Receiving-end Address | Transmitting-end Address | RTS Parameter | CRC |

FIG. 15

| Type | Length | Receiving-end Address | Transmitting-end Address | CTS Parameter | CRC |

FIG. 16

| Type | Length | Receiving-end Address | Transmitting-end Address | Attribute | CRC | Data Payload Information | CRC |

FIG. 17

| Type | Length | Receiving-end Address | Transmitting-end Address | ACK Parameter | CRC |

FIG. 18

| Type | Length | MAC Address | Timing | Network ID | CRC | Priority Utilization Period Information | CRC |

FIG. 26

| Type | Length | Receiving-end Address | Transmitting-end Address | Command | CRC | Priority Utilization Period Information | CRC |

FIG. 27

WIRELESS COMMUNICATION SYSTEM, WIRELESS COMMUNICATION APPARATUS, WIRELESS COMMUNICATION METHOD, AND COMPUTE PROGRAM

CROSS-REFERENCE TO RELATED APPLICATIONS

This application is a divisional of U.S. application Ser. No. 10/510,011, filed Sep. 29, 2004, now U.S. Pat. No. 7,630,334, issued Dec. 8, 2009, which is a national stage application of International Application No. PCT/JP04/06101, filed Apr. 27, 2004, which claims priority from Japanese Application No. 2003-129546, filed May 7, 2003, the disclosures of which are hereby incorporated by reference herein.

BACKGROUND OF THE INVENTION

1. Technical Field

The present invention relates to wireless communication systems, wireless communication apparatuses, wireless communication methods, and computer programs which mutually perform communication between a plurality of wireless stations in a wireless LAN (Local Area Network) or the like. In particular, the present invention relates to a wireless communication system, a wireless communication apparatus, a wireless communication method, and a computer program which efficiently transmit isochronous data, such as AV content.

More specifically, the present invention relates to a wireless communication system, a wireless communication apparatus, a wireless communication method, and a computer program which efficiently transmit isochronous data in an ad-hoc (ad-hoc) communication environment in which individual communication stations forms a network in an autonomous distributed manner without the relationship of a controlling station and a controlled station. In particular, the present invention relates to a wireless communication system, a wireless communication apparatus, a wireless communication method, and a computer program which perform data transmission with a guaranteed bandwidth in an ad-hoc communication environment.

2. Background Art

As a system for freeing users from LAN wiring of a wired scheme, wireless LANs are gaining attention. Since wireless LANs can omit a majority of wire cables in work spaces such as offices, communication terminals, such as personal computers (PCs), can be moved with relative ease.

In recent years, in conjunction with an increased speed and reduced cost of wireless LAN systems, the demand thereon has increased considerably. In particular, recently, in order to construct a small-scale wireless network with multiple pieces of electronic equipment available around people to perform information communication, the incorporation of a personal area network (PAN) is under consideration. For example, frequency bands, such as a 2.5 GHz band, a 5 GHz band, and so on, that do require a license of a regulatory agency, are utilized to define different wireless communication systems.

A method that is typically used to configure a local area network using a wireless technology is that one apparatus that serves as a controlling station, called an "access point", is provided in an area to form a network under the centralized control of the controlling station. In this case, the access point provides synchronization between communication apparatuses in the wireless network. Access control based on band reservation is performed. That is, a communication apparatus that attempts to perform isochronous communication first makes a reservation with the access point for a band required for the information transmission and utilizes a transmission path so that the information transmission does not collide with information transmission of another communication apparatus.

However, when asynchronous communication is performed between a transmitting-side communication apparatus and a receiving-side communication apparatus, wireless communication that goes through an access point is always required. Thus, there is a problem in that the utilization efficiency of a transmission path is reduced by half.

In contrast, "ad-hoc (ad-hoc) communication", in which terminals perform wireless communication with each other directly, has been proposed. In particular, in a small-scale wireless network constituted by a relatively small number of clients located in the vicinity, ad-hoc communication that allows arbitrarily terminals to perform wireless communication with each other without use of a particular access point is considered to be appropriate.

For example, a mode that operates on a peer-to-peer (peer to peer) basis in an autonomous distributed manner without the provision of a controlling station has been prepared for a wireless LAN system based on IEEE 802.11.

On the other hand, in order to transfer isochronous and time-sequence data, such as AV content for which data needs to be transmitted periodically at regular intervals, a bandwidth must be guaranteed.

For example, IEEE 802.11 TG-e is promoting a study for a communication method based on the premise of bandwidth guarantee using a wireless LAN system.

However, when an attempt is made to guarantee a bandwidth in a conventional wireless LAN system, a typically used approach is that a specific controlling station is defined so as to centrally control communication resources and to specify time that is activated in a limited manner in a certain group. The right of transmission is centrally generated at a communication apparatus that serves as a transmitting end of information and a wireless communication apparatus that serves as a receiving end is dependent on and is controlled by the transmitting-end communication apparatus.

This case is based on a premise that a communication apparatus that serves as the specific controlling station is defined, and is not applicable to a system in which the controlling-station apparatus is not provided. In particular, when bandwidth-reservation-based communication is implemented by forming an ad-hoc network without the relationship of a controlling station and a controlled station, it is difficult to determine to which range of influence should be considered. Further, since the right of transmission is centrally generated at a communication apparatus that serves as a transmitting end of information, a notification cannot be issued to indicate that a wireless communication apparatus that serves as a receiving end is in use for receiving a signal at a predetermined timing.

Also, isochronous communication is performed to transmit isochronous data, i.e., time-sequential data. In this case, a predetermined communication band (or time) for isochronous communication is reserved in advance and specific communication apparatuses exclusively perform communication with each other in the communication band (or time).

For example, as a technology that is currently being standardized for a wireless personal area network (WPAN) based on IEEE 802.15.3, a scheme is considered in which a predetermined communication band is reserved as a guaranteed time slot (GTS) so that isochronous communication is performed in the band.

However, in the conventional wireless LAN system, when an attempt is made to perform bandwidth-guaranteed communication such as isochronous communication, there is a need for a scheme for sharing the amount of its guaranteed bandwidth with another communication apparatus. Thus, a communication apparatus that serves as a particular controlling station needs to be defined so as to centrally manage the amount of communication. In other words, such communication with a guaranteed bandwidth is not directly applicable to a wireless communication system that does not have the relationship of a controlling station and a controlled station.

Further, communication between other apparatuses needs to be prevented from communicating with each other at time when isochronous communication is performed. Thus, in this respect, the controlling station also needs to centrally identify the communication apparatuses that use the time. That is, it is extremely difficult to realize band-reservation-based communication, such as isochronous communication, by forming an ad-hoc network.

SUMMARY OF THE INVENTION

The present invention has been made in view of the foregoing problems, and a first aspect of the present invention provides a wireless communication system that forms a network in an autonomous distributed manner without the relationship of a controlling station and a controlled station. The wireless communication system is characterized in that a transmitting-side or receiving-side communication apparatus that attempts to perform communication with a guaranteed bandwidth issues, to within own communication range, a notification indicating a setting of a bandwidth guaranteed period and another communication apparatus that receives the notification does not perform a communication operation in the bandwidth guaranteed period, thereby avoiding signal collision and interference in the communication range and guaranteeing a bandwidth.

The "system" herein refers to a logically assembled unit of a plurality of apparatuses (or functional modules that realize specific functions) and individual apparatuses or functional modules may or may not be provided in a single housing.

In this case, the transmitting-side or receiving-side communication apparatus may describe information regarding the bandwidth guaranteed period in beacon information transmitted for each predetermined frame period. Informing of timing utilized for a bandwidth-guaranteed communication by using a beacon signal allows any number of neighboring wireless communication apparatuses to be notified in advance that a bandwidth-guaranteed communication is to be performed.

Further, the receiving-side communication apparatus may create timing utilized for a bandwidth-guaranteed communication, in a pseudo manner, to have the same state as timing of transmitting own beacon and may notify of the timing utilized for the bandwidth-guaranteed communication. In such a case, a wireless communication apparatus that exists in a region to be a hidden terminal viewed from the transmitting-side communication apparatus can also be notified that a band-reservation communication is performed.

The transmitting-side or receiving-side communication apparatus may set a reservation period in its own frame period so as to perform an isochronous communication with a guaranteed bandwidth by exclusively utilizing the reservation period.

When each wireless communication apparatus notifies of timing the self can utilize for a band-reservation communication, it is possible to achieve a band-reservation communication without the relationship of a controlling station and a controlled station. Each communication apparatus can exclusively use a reserved slot. Another communication apparatus cannot use the reserved slot without undergoing a special procedure, such as clearing the reservation.

Each communication apparatus restrains a communication operation in a reservation period set by another communication apparatus. As a result, communication collision and interference are avoided. That is, each communication apparatus collects beacon information from neighboring communication apparatuses; obtains information regarding bandwidth guaranteed periods; and does not set, as the own bandwidth guaranteed period, a period that is set as the bandwidth guaranteed periods by the neighboring communication apparatuses. Also, the transmitting-side or receiving-side communication apparatus collects beacon information from neighboring communication apparatuses; obtains information regarding bandwidth guaranteed periods; and sets, as the own bandwidth guaranteed period, a period that is not set as the bandwidth guaranteed periods by the neighboring communication apparatuses. This can achieve isochronous communication based on band reservation in an ad-hoc network and can ensure a band during transmission of isochronous data, such as AV content.

Further, a second aspect of the present invention provides a wireless communication system that forms a network in an autonomous distributed manner without the relationship of a controlling station and a controlled station. The wireless communication apparatus is characterized in that a transmitting-side or receiving-side communication apparatus sets a period utilizable with priority in own frame period and performs communication with a guaranteed bandwidth by utilizing the priority utilization period with priority, to thereby perform an isochronous communication with a guaranteed bandwidth by utilizing the priority utilization period with priority while avoiding signal collision and interference in the communication range.

The above-noted reservation period is an exclusively-occupied time period and thus a transmission path is exclusively used by particular communication apparatuses. In a method for performing communication by exclusively using a transmission path over a predetermined communication band (time), when an isochronous communication that does not fill the once-set predetermined communication band (time) is performed, the insufficient portion cannot be used for communication between other communication apparatuses and thus the throughput decreases. On the other hand, in an access control method based on CSMA (or PSMA)/CA, each communication apparatus performs a collision avoidance operation that starts transmission after detecting that no transmission is performed from another communication, and thus communication is started unless a carrier signal is detected. This makes it impossible to guarantee that a transmission path is exclusively occupied and utilized for a specific communication.

Accordingly, in the second aspect of the present invention, each wireless communication apparatus sets a period (timing) that the self can utilize with priority and performs isochronous communication in the priority utilization period with priority, as required.

In this case, before the priority utilization period ends, when an isochronous communication with a guaranteed bandwidth between transmitting-side communication apparatus and the receiving-side communication apparatus has finished, i.e., when the priority utilization time has finished, arbitrary communication between other communication apparatuses may be performed.

The priority utilization period herein refers to a period that a communication can utilize with priority and is different from a reservation period in which a communication apparatus that has made a reservation exclusively uses a transmission path. In the priority utilization period, priority utilization of a bandwidth is guaranteed, but utilization by another communication apparatus is not completely excluded. Thus, another apparatus can also utilize the band within a range in which the priority utilization is guaranteed. Therefore, while a communication apparatus sets a period that it can utilize with priority to perform an isochronous communication, arbitrarily communication between other communication apparatuses is permitted when that isochronous communication has not been performed or has been finished. As a result, when an isochronous communication that does not fill a priority utilization period is performed, the insufficient portion can be used for communication between other communication apparatuses, thereby improving the throughput.

In a case in which another communication is performed at a point of time when a priority utilization period set by the self arrives, the transmitting-side communication apparatus may temporarily delay the start of an isochronous communication and may perform transmission based on a priority utilization after the end of the another communication.

Starting a predetermined isochronous communication after the end of another communication can achieve an isochronous communication that coexists with another communication. In such a case, while the start of a priority utilization period is temporarily delayed, it can be expected that the throughput is improved in terms of the entire system and the temporary delay is recovered. This is because the priority utilization state is cleared, i.e., a band is released, when an isochronous communication that does not fill the priority utilization period is performed.

A third aspect of the present invention provides a computer program that is described in a computer-readable format so that processing for performing a wireless communication operation in an autonomous distributed manner without the relationship of a controlling station and a controlled station is executed on a computer system.

The computer program is characterized by including a bandwidth-guaranteed-period setting step of notifying, within own communication range, of the setting of a bandwidth guaranteed period in which a bandwidth is guaranteed; and a communication controlling step of executing a bandwidth-guaranteed communication in response to the arrival of the own bandwidth guaranteed period.

A fourth aspect of the present invention provides a computer program that is described in a computer-readable format so that processing for performing a wireless communication operation in an autonomous distributed manner without the relationship of a controlling station and a controlled station is executed on a computer system.

The computer program is characterized by including a priority-utilization-period setting step of setting a priority utilization period for performing communication with a guaranteed bandwidth in own frame period and notifying, within own communication range, of the setting of the priority utilization period, and a communication controlling step of performing communication with a guaranteed bandwidth, with priority, in response to the arrival of the own priority utilization period.

The computer program according to each of the third and fourth aspects of the invention defines a computer program that is described in a computer-readable format so that predetermined processing is achieved on a computer system. In other words, installing the computer program according to each of the third and fourth aspects of the invention onto a computer system provides the computer system with a cooperative effect and also causes the computer system to operate as a communication apparatus. Starting the operation of a plurality of such communication apparatuses to construct a wireless network can provide the same advantages as the wireless communication apparatus according to each of the first and second aspects of the present invention.

Further objects, features, and advantages of the present invention will become apparent from detailed descriptions based on the following embodiments of the present invention and the accompanying drawings.

BRIEF DESCRIPTION OF THE DRAWINGS

FIG. 10 is a diagram showing an example of the frame structure of a beacon signal.

FIG. 11 is a diagram showing an example of the frame structure of reservation request command information.

FIG. 12 is a diagram showing an example of the frame structure of acknowledgement-notification command information.

FIG. 13 is a diagram showing an example of the frame structure of reservation notification command information.

FIG. 14 is a diagram showing an example of the frame structure of a pseudo beacon signal.

FIG. 15 is a diagram showing an example of the frame structure of an RTS command.

FIG. 16 is a diagram showing an example of the frame structure of a CTS command.

FIG. 17 is a diagram showing an example of the frame structure of data frame.

FIG. 18 is a view showing an example of the frame structure of an ACK frame.

FIG. 26 is a diagram showing an example of the frame structure of beacon information.

FIG. 27 is a diagram showing an example of the frame structure of a priority-utilization-period notification command.

DETAILED DESCRIPTION

Best Mode for Carrying Out the Invention

Embodiments of the present invention will now be described below in detail with reference to the drawings.

First Embodiment

Figure 1:
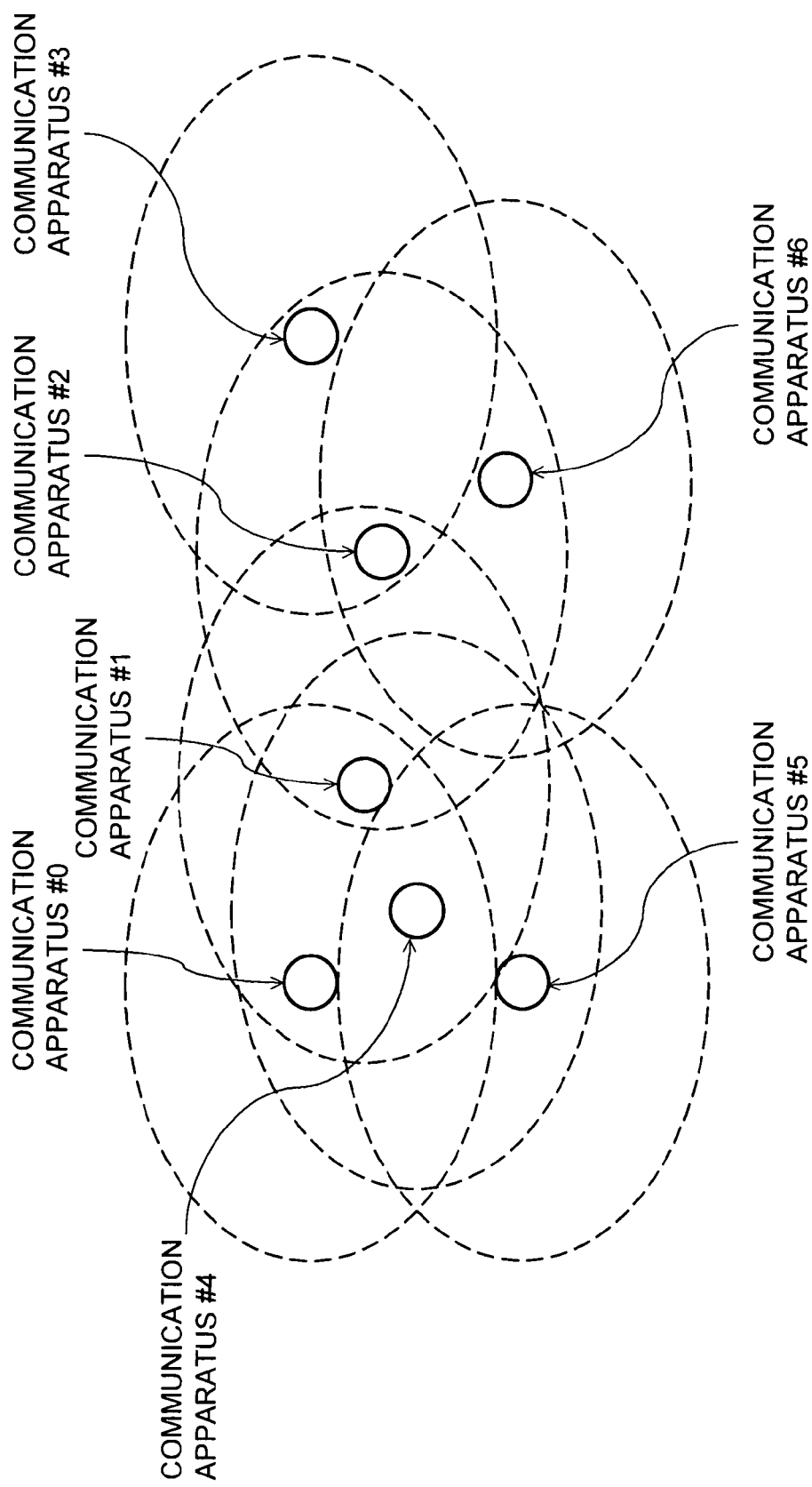
FIG. 1 shows an example of arrangement of communication apparatuses that constitute a wireless communication apparatus according to one embodiment of the present invention.

FIG. 1 shows an example of arrangement of communication apparatuses that constitute a wireless communication apparatus according to one embodiment of the present invention. In this wireless communication system, a specific controlling station is not arranged and individual communication apparatuses operate in an autonomous distributed manner to form an ad-hoc network. The figure shows a state in which a communication apparatus #0 to a communication apparatus #6 are distributed in the same space.

In the figure, the communication range of each communication apparatus is indicated by a dotted line and is defined as a range in which the communication apparatus not only can communicate with another communication apparatus that is located within the range but also a signal transmitted by the self causes interference. That is, the communication apparatus #0 is in a range that allows communication with the communication apparatus #1 and the communication apparatus #4 which are located in the vicinity. The communication apparatus #1 is also in a range that allows communication with the communication apparatus #0, the communication apparatus #2, and the communication apparatus #4 which are located in the vicinity. The communication apparatus #2 is also in a range that allows communication with the communication apparatus #1, the communication apparatus #3, and the communication apparatus #6 which are located in the vicinity. The communication apparatus #3 is in a range that allows communication with the communication apparatus #2 located in the vicinity. The communication apparatus #4 is also in a range that allows communication with the communication apparatus #0, the communication apparatus #1, and the communication apparatus #5 which are located in the vicinity. The communication apparatus #5 is in a range that allows communication with the communication apparatus #4 located in the vicinity. The communication apparatus #6 is in a range that allows communication with the communication apparatus #2 located in the vicinity.

In this embodiment, each communication apparatus performs access control utilizing one wireless transmission path in a time-shared manner, while mutually considering influences with other communication apparatuses located in the neighbor.

Figure 2:
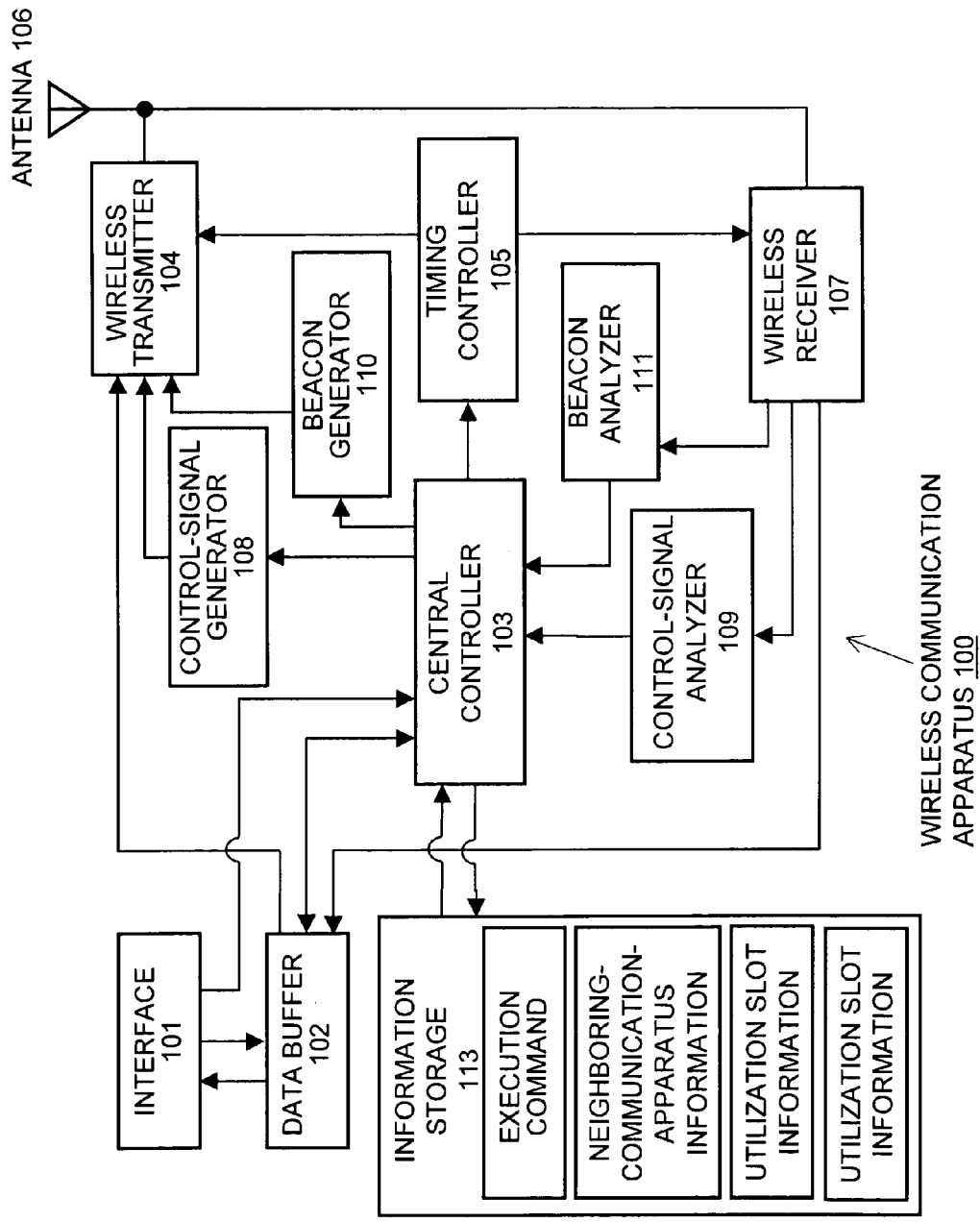
FIG. 2 is a diagram schematically showing the functional configuration of a wireless communication apparatus that operates in the wireless network environment shown in FIG. 1.

FIG. 2 schematically shows the functional configuration of a wireless communication apparatus 100 that operates in the wireless network environment shown in FIG. 1. The wireless communication apparatus 100 includes an interface 101, a data buffer 102, a central controller 103, a wireless transmitter 104, a timing controller 105, an antenna 106, a wireless receiver 107, a control-signal generator 108, a control-signal analyzer 109, a beacon generator 110, a beacon analyzer 111, and an information storage 113.

The interface 101 exchanges various types of information with external equipment (e.g., a personal computer (not shown)) connected with the wireless communication apparatus 100.

The data buffer 102 is used to temporarily store data transmitted from the equipment connected via the interface 101 and data received, before transmitting the data via the interface 101.

The central controller 103 centrally performs the management of a series of information transmission and reception processing and transmission-path access control at the wireless communication apparatus 100.

In this embodiment, in an ad-hoc network environment in which individual communication stations form a network in an autonomous distributed manner without the relationship of a controlling station and a controlled station, the wireless communication apparatus 100 performs communication operation, such as isochronous communication utilizing a reservation period or a priority utilization period (described below) or a random-access communication based on the CSMA/CA (Carrier Sense Multiple Access/Collision Avoidance). Each wireless communication apparatus transmits a beacon at the start of a predetermined frame period (hereinafter also referred to a "superframe period") (the frame lengths are uniform, but the frame-start times of communication apparatuses are not synchronous with each other since they are not controlled by a controlling station).

A frame period is constituted by a plurality of slots. The central controller 103 sets a slot that the self utilizes for an isochronous communication, stores the content of the setting in the information storage 113, and describes the content in a beacon to inform the neighboring wireless communication apparatuses about the content of the setting.

In order to wirelessly transmit data and a beacon which are temporarily stored in the data buffer 102, the wireless transmitter 104 modulates the data and the beacon into, for example, ultra-wide band signals.

The timing controller 105 controls timing of transmitting/receiving ultra-wide band signals. For example, the timing controller 105 controls a reservation period that is already obtained, timing of receiving its own beacon, timing of receiving a beacon (including a pseudo beacon (described below)) from another communication apparatus, and so on.

The antenna 106 wirelessly transmits signals to another wireless communication apparatus or collects signals transmitted from another wireless communication apparatus.

The wireless receiver 107 performs processing for receiving signals of information, a beacon, and so on transmitted from another wireless communication apparatus at predetermined time.

Prior to data transmission, the control-signal generator 108 generates information, such as a reservation request, an acknowledgement notification, and a reservation notification, as required.

The control-signal analyzer 109 analyzes information of a reservation request, an acknowledgement notification, and a reservation notification transmitted from a neighboring wireless communication apparatus.

The beacon generator 110 generates a beacon signal that is periodically exchanged with wireless communication apparatuses located in the vicinity.

The beacon analyzer 111 analyzes a beacon signal that was able to be received from another wireless communication apparatus and analyzes a slot utilized and the presence of a neighboring wireless communication apparatus.

The information storage 113 stores execution procedure commands, such as a series of access control operations executed by the central controller 103 and the address of a neighboring wireless communication apparatus from which a beacons has been detected. The information storage 113 also stores, for example, beacon transmission position (timing) information of a neighboring wireless communication apparatus that exists in the own neighbor, parameters (utilization slot information and priority-utilization-period information) that are described in a beacon and that are associated with a reservation communication of a neighboring wireless communication apparatus.

Figure 3:
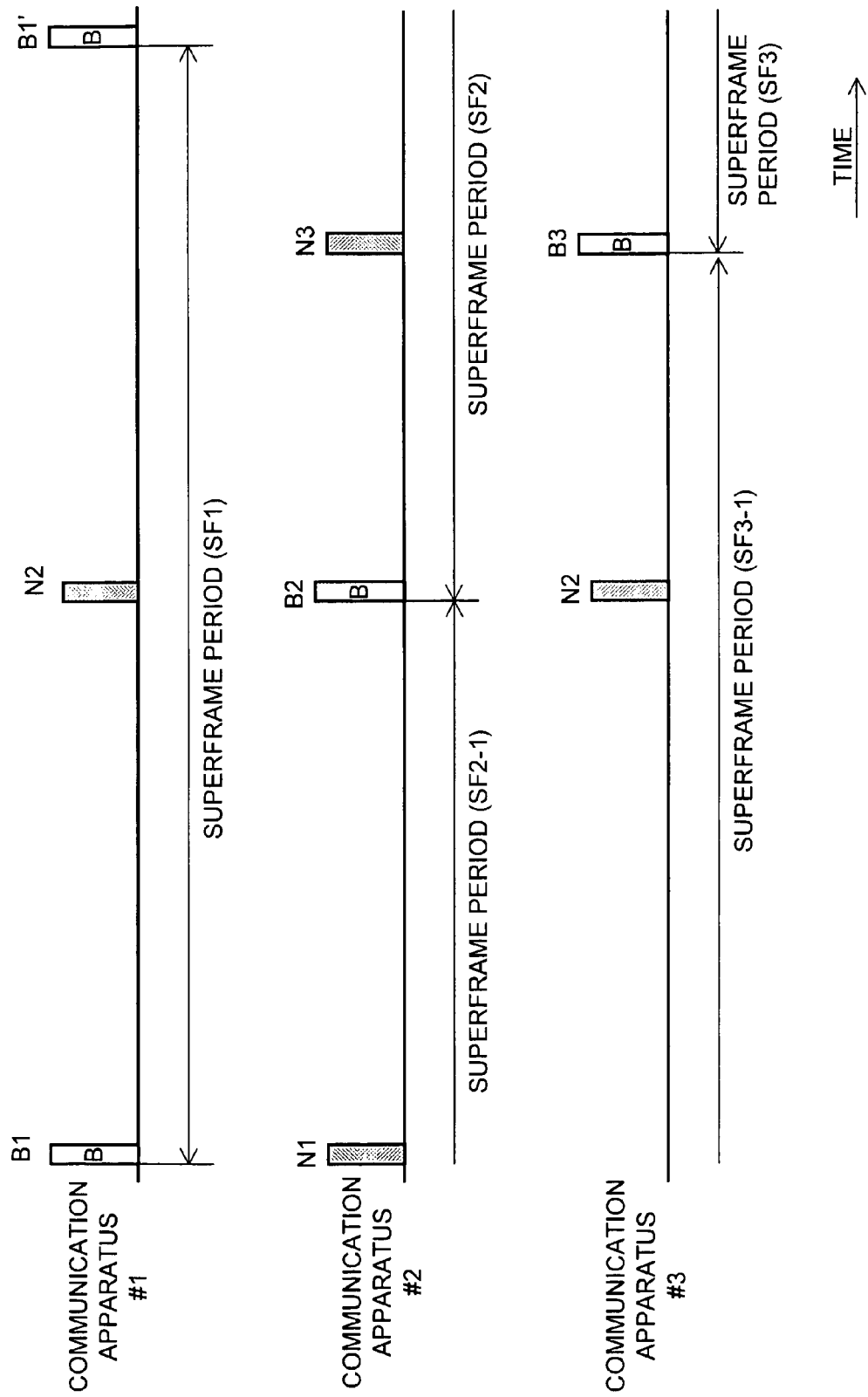
FIG. 3 is a diagram showing an example of the configuration of a superframe of each wireless communication apparatus in an ad-hoc network according to this embodiment.

FIG. 3 shows an example of the configuration of a superframe of each wireless communication apparatus in the ad-hoc network according to this embodiment.

In the example shown in this figure, by autonomously determining a superframe period and periodically transmitting a beacon, each communication apparatus is adapted to cause a neighboring communication apparatus to recognize the presence of the self. While the frame lengths are uniform, the frame start time is uniquely set for each communication apparatus since it is not controlled by a controlling station.

Each wireless communication apparatus transmits its own beacon so that the transmission position thereof does not overlap the transmission positions of (existing) beacons of neighboring communication apparatuses, thereby making it possible to construct an autonomous-distributed, ad-hoc network.

In the illustrated example, in the communication apparatus #1, a period from a beacon (B1) to a next beacon (B1') is defined as a superframe period (SF1).

With regard to the communication apparatus #2, when it transmits a beacon (B2), a superframe period (SF2) is defined and a period prior thereto is treated as a superframe period (SF2−1).

With regard to the communication apparatus #3, when it transmits a beacon (B3), a superframe period (SF3) is defined and a period prior thereto is treated as a superframe period (SF3−1).

In this case, the communication apparatus #1 receives a beacon (N2) from the communication apparatus #2 located in the vicinity. The communication apparatus #2 receives a beacon (N1) from the communication apparatus #1 in the vicinity and a beacon (N3) from the communication apparatus #3. The communication apparatus #3 also receives the beacon (N2) from the communication apparatus #2 in the vicinity.

In the wireless network configuration shown in FIG. 1, the communication apparatus #1 also receives beacons from the communication apparatuses #0 and #4 and the communication apparatus #2 receives a beacon from the communication apparatus #6. The details thereof, however, are omitted here for simplicity of description.

Figure 4:
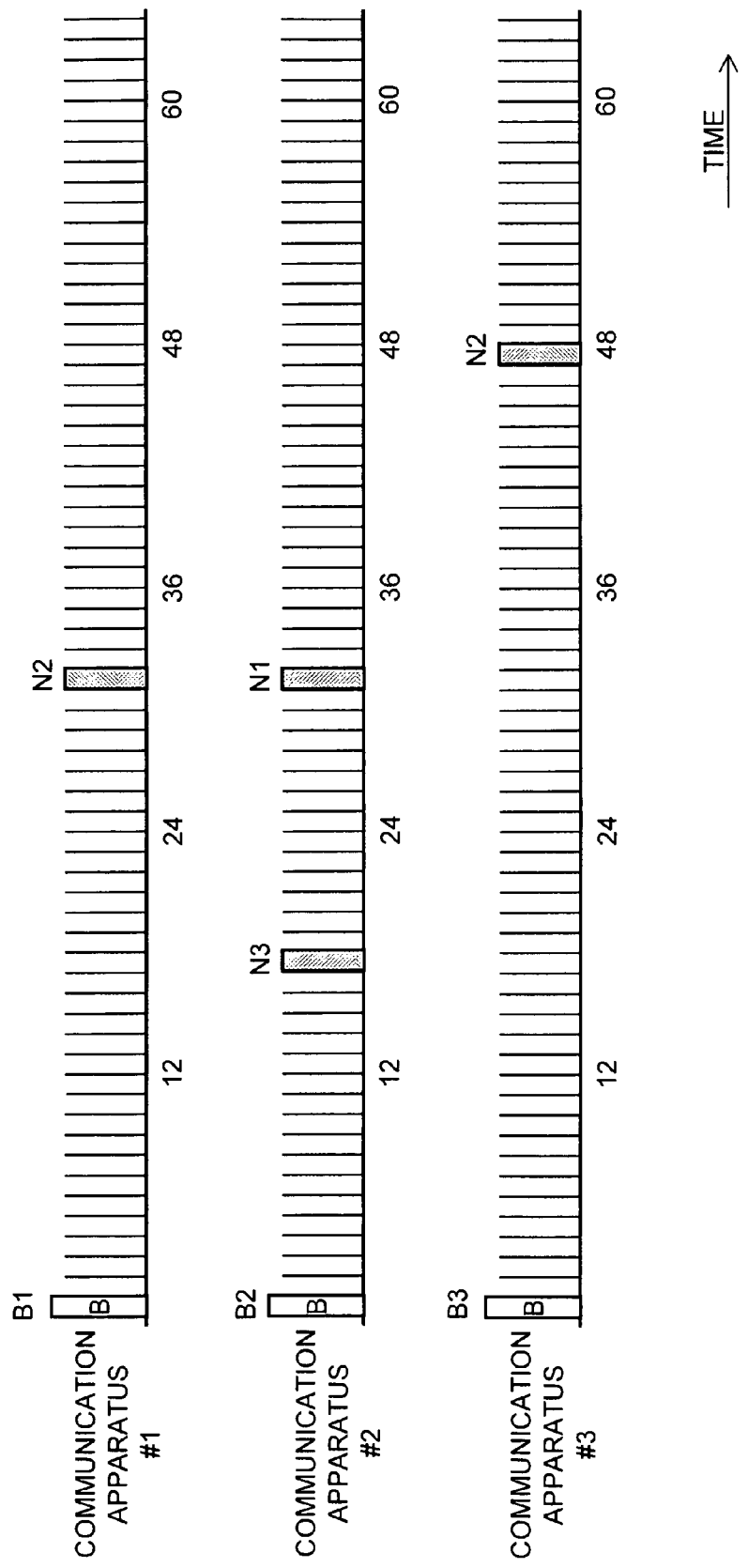
FIG. 4 is a diagram showing an example of arrangement of slots recognized by each communication apparatus itself.

A superframe period is constituted by a plurality of slots (64 lots in this case) and a slot is a minimum unit of access. FIG. 4 shows an example of arrangement of slots recognized by each communication apparatus itself. With reference to its own superframe period (i.e., with a starting point at the transmission timing of its own beacon), the wireless communication apparatus arranges the slots in terms of a relative position at which a beacon signal is received from a neighboring communication apparatus.

It is shown that the communication apparatus #1 receives a beacon from the communication apparatus #2, at the 32nd position, with the own beacon transmission position being 0th position.

It is shown that, with the own beacon transmission position being 0th position, the communication apparatus #2 receives a beacon from the communication apparatus #3, at the 18th position, and receives a beacon from the communication apparatus #1, at the 32nd position.

It is shown that the communication apparatus #3 receives a beacon from the communication apparatus #2, at the 48th position, with the own beacon transmission position being 0th position.

In this embodiment, each wireless communication apparatus contains such a slot arrangement relationship, as a utilization slot information parameter, in a beacon that is periodically transmitted, and notifies the neighboring communication apparatuses about the relationship. The wireless communication apparatuses then perform processing for transmitting and receiving information while mutually avoiding slots utilized by other communication apparatuses. This makes it possible to autonomously form an ad-hoc network while avoiding collision and interference.

A transmitting-side wireless communication apparatus issues a reservation request to a receiving-side wireless communication apparatus. In response to the reservation request, the receiving-side wireless communication apparatus returns an acknowledgement notification. Neighboring communication apparatuses are notified of a beacon in which a reserved utilization slot is described, so that the communication apparatuses can use the utilization slot for transmitting/receiving information to/from each other.

Figure 5:
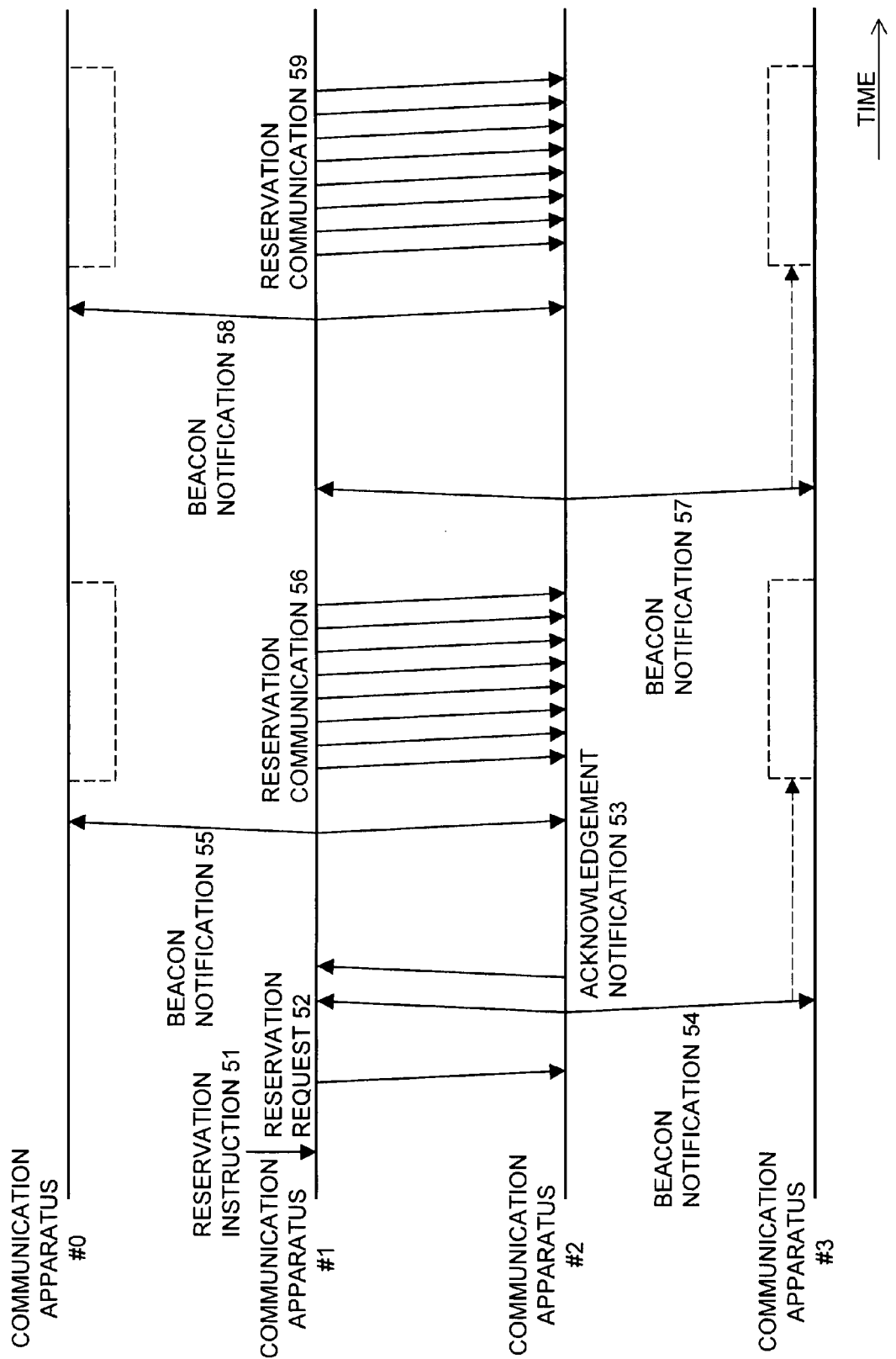
FIG. 5 is diagram showing a sequence of reservation processing performed by a transmitting side.

FIG. 5 illustrates a reservation processing sequence. In the illustrated example, equipment connected with the communication apparatus #1 that serves as a transmitting end of reservation communication issues a reservation instruction and the receiving-end communication apparatus #2 responds thereto to perform a reservation communication.

First, equipment connected with the transmitting-end communication apparatus #1 issues a reservation instruction 51 and the transmitting-end communication apparatus #1 issues a reservation request 52 to the receiving-end communication apparatus #2. At this point, parameters of an approximate amount of requested reservation communication are exchanged.

In response to the reservation request, the communication apparatus #2 that serves as a receiving-end of reservation communication uses an acknowledgement notification 53 and a beacon 54 to notify of a slot available for communication and so on.

Further, the transmitting-end communication apparatus #1 determines a slot to be utilized for a reservation communication, based on the acknowledgement notification 53 and the beacon 54, and uses a beacon 55 to notify the neighbors about the slot to be utilized.

Thereafter, when the slot to be utilized arrives, the transmitting-end communication apparatus #1 actually performs reservation communication 56 to the receiving-end communication apparatus #2.

Thereafter, as long as a series of reservation communications is continued, a beacon 57 of the receiving-end communication apparatus #2 continuously notifies of slot information utilized. Further, after the end of the communication, when time that has been indicated by the slot information utilized is left, other communication apparatuses #0 and #3 can utilize the slot and can perform, for example, random access based on the CSMA/CA.

Similarly, thereafter, as long as a series of reservation communications is continued, a beacon 58 of the transmitting-end communication apparatus #1 continuously notifies of slot information utilized and a reservation communication 59 is performed. After the end of the communication, when time indicated by the slot information utilized is left, other communication apparatuses #0 and #3 can utilize the slot and can perform, for example, random access based on the CSMA/CA.

The communication apparatus #1 and the communication apparatus #2 issue respective beacons in which slot information is described to neighboring communication apparatuses. In this case, the beacon from the communication apparatus #1 reaches the communication apparatus #0, which is a hidden terminal from the communication terminal #2, and the beacon from the communication apparatus #2 reaches the communication apparatus #3, which is a hidden terminal from the communication apparatus #1. That is, a notification indicating that a reservation communication is to be performed is issued within the both communication ranges of the transmitting-end communication apparatus #1 and the receiving-end communication apparatus #2. Other communication apparatuses #0 and #3 that have received the notification are adapted not to perform intended communication operations using the reserved slot. As a result, collision and interference are avoided and a bandwidth is guaranteed.

The transmitting-end communication apparatus #1 and the receiving-end communication apparatus #2 can use a slot for which reservation intension is indicated, with priority. Another communication apparatus cannot unconditionally use the slot for which the reservation intension is indicated, unless it undergoes a special and additional procedure (which is not explained in the description), such as clearing the reservation intension.

Figure 6:
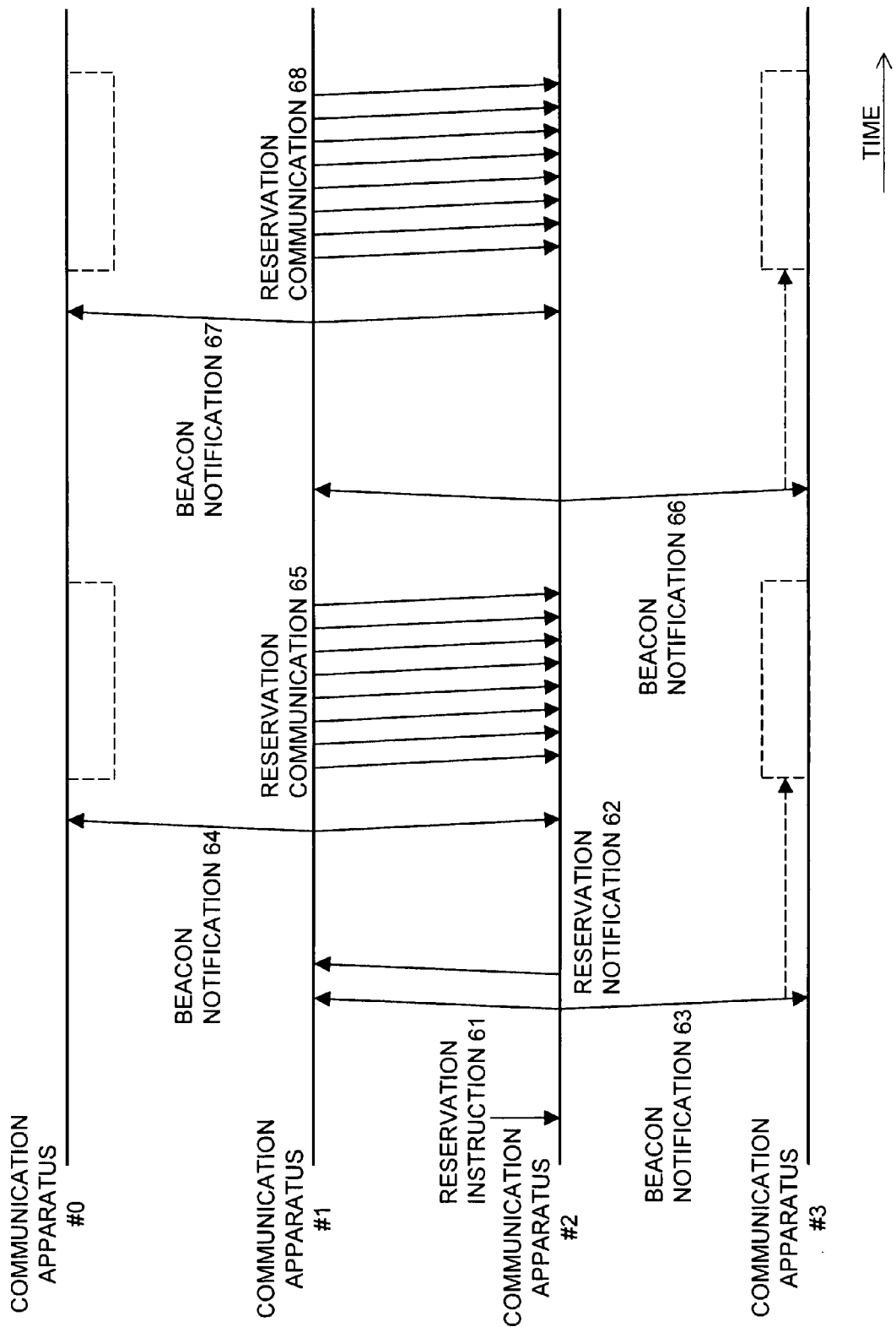
FIG. 6 is diagram showing a sequence of reservation processing performed by a receiving side.

In the example shown in FIG. 5, although the reservation processing sequence is performed in response to a request from a transmitting side, the reservation processing sequence can also be performed in response to a request from a receiving side. For example, an example of such a case is that a receiving-end communication apparatus issues a content-distribution request to a transmitting-end communication apparatus. FIG. 6 shows a sequence of reservation processing performed by a receiving side. In the illustrated example, equipment connected with the communication apparatus #2 that serves as a receiving-end of reservation communication issues a reservation instruction and the transmitting-end communication apparatus #1 responds thereto to thereby perform a reservation communication.

First, equipment connected with the receiving-end communication apparatus #2 issues a reservation instruction 61 and the receiving-end communication apparatus #2 issues a reservation notification 62 to the transmitting-end communication apparatus #1. At this point, parameters of an approximate amount of requested reservation communication are exchanged.

In this case, in conjunction with the reservation notification, a beacon notification 63 may notify the neighboring communication apparatuses that a reservation communication is to be performed.

The transmitting-end communication apparatus #1 that has received the reservation notification determines a slot to be utilized for the reservation communication and uses a beacon 64 to notify the neighbors about the slot to be utilized.

Thereafter, when the slot to be utilized arrives, the transmitting-end communication apparatus #1 actually performs a reservation communication 65 to the receiving-end communication apparatus #2.

Thereafter, as long as a series of reservation communications is continued, a beacon 66 of the receiving-end communication apparatus #2 continuously notifies of slot information utilized. After the end of the communication, when time indicated by the slot information utilized is left, other communication apparatuses #0 and #3 can utilize the slot and can perform, for example, random access based on the CSMA/CA.

Similarly, thereafter, as long as a series of reservation communications is continued, a beacon 67 of the transmitting-end communication apparatus #1 continuously notifies of slot information utilized and a reservation communication 68 is performed. After the end of the communication, when time indicated by the slot information utilized is left, other communication apparatuses #0 and #3 can utilize the slot and can perform, for example, random access based on the CSMA/CA.

The communication apparatus #1 and the communication apparatus #2 issue respective beacons in which slot information is described to neighboring communication apparatuses. In this case, the beacon from the communication apparatus #1 reaches the communication apparatus #0, which is a hidden terminal from the communication terminal #2, and the beacon from the communication apparatus #2 reaches the communication apparatus #3, which is a hidden terminal from the communication apparatus #1. That is, a notification indicating that a reservation communication is to be performed is issued to within the both communication ranges of the transmitting-end communication apparatus #1 and the receiving-end communication apparatus #2. Other communication apparatuses #0 and #3 that have received the notification are adapted not to perform intended communication operations using the reserved slot. As a result, collision and interference are avoided and a bandwidth is guaranteed.

The transmitting-end communication apparatus #1 and the receiving-end communication apparatus #2 can use a slot for which reservation intension is indicated, with priority. Another communication apparatus cannot unconditionally use the slot for which the reservation intension is indicated, unless it undergoes a special and additional procedure (which is not described in the specification), such as clearing the reservation intension.

Figure 7:
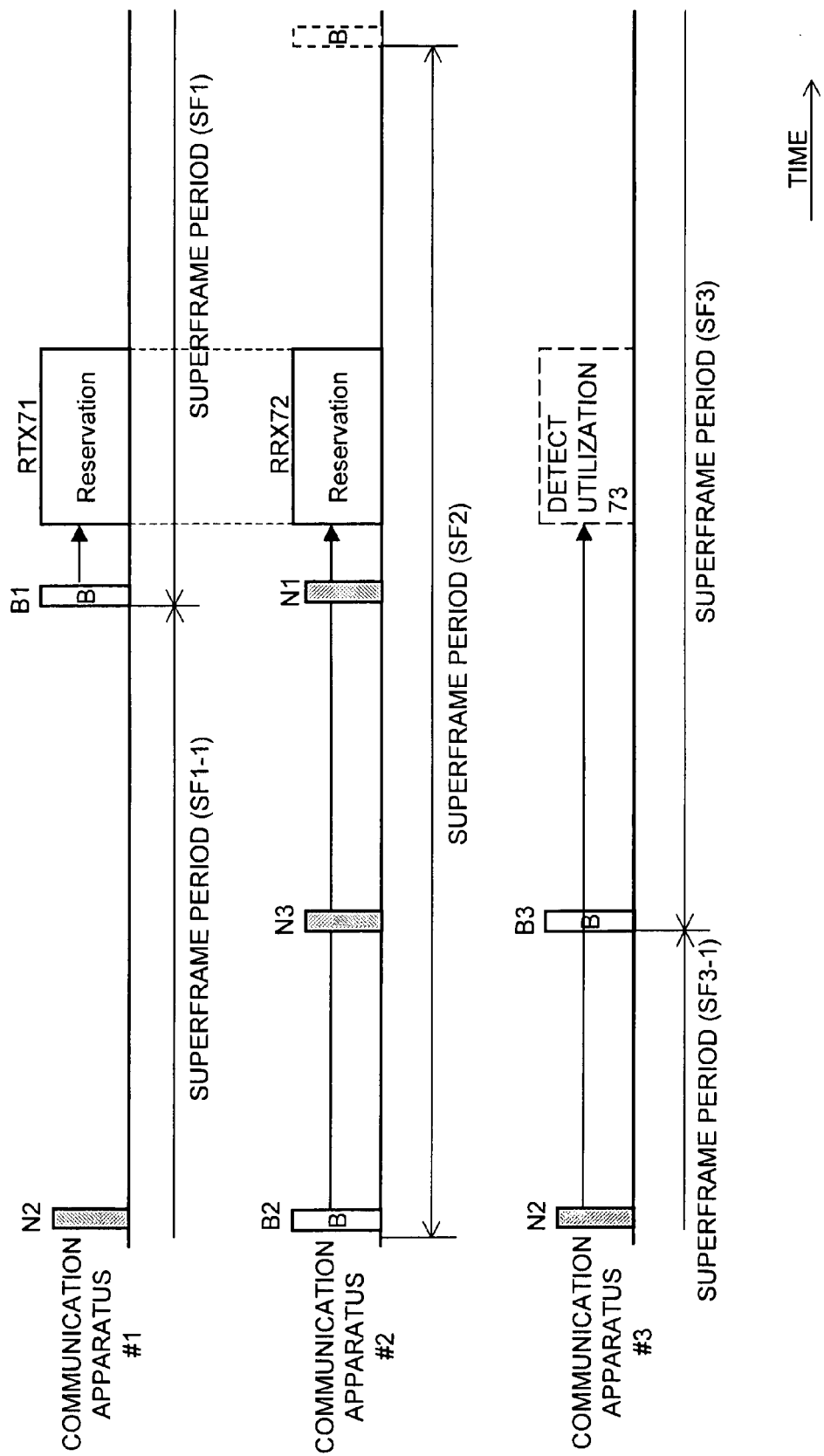
FIG. 7 is a diagram showing an example of the configuration of a superframe when a reservation communication is performed in the ad-hoc network according to the embodiment of the present invention.

The configuration of superframe of each wireless communication apparatus in the ad-hoc network according to this embodiment has already been described with reference to FIG. 3. FIG. 7 shows an example of the configuration of a superframe for performing a reservation communication in the ad-hoc network.

In the communication apparatus #1, a period from a beacon (B1) to a next beacon (B1') (not shown) is defined as a superframe period (SF1). With regard to the communication apparatus #2, when it transmits a beacon (B2), a superframe period (SF2) is defined and a period prior thereto is treated as a superframe period (SF2−1) (not shown). Further, with regard to the communication apparatus #3, when it transmits a beacon (B3), a superframe period (SF3) is defined and a period prior thereto is treated as a superframe period (SF3−1).

In this case, the communication apparatus #1 receives a beacon (N2) from the communication apparatus #2 located in the vicinity. The communication apparatus #2 receives a beacon (N1) from the communication apparatus #1 in the vicinity and a beacon (N3) from the communication apparatus #3. The communication apparatus #3 also receives the beacon (N2) from the communication apparatus #2 in the vicinity.

In this embodiment, when each communication apparatus autonomously determines a superframe period, the communication apparatus periodically notifies of a portion for a reservation communication by using a beacon signal, so that the neighboring communication apparatuses are notified of the presence of the reservation communication. In the example shown in FIG. 7, the communication apparatus #1 that serves as a transmitting end of reservation communication performs a reservation communication (RTX) 71 to the receiving-end communication apparatus #2. In synchronization with the timing, the receiving-end communication apparatus #2 performs a reception (RRX) 72.

Through the use of the beacon (B1) from the transmitting-end communication apparatus #1 and the beacon (B2) from the receiving-end communication apparatus #2, the neighbors are notified of an intension indication for a reservation communication. Accordingly, the communication apparatus #3, which is a hidden terminal from the communication apparatus #1, can detect the utilization of a slot for a reservation communication in advance. Thus, in the time period 73, the communication apparatus does not perform a communication operation unconditionally, so that collision and interference are avoided and a bandwidth is guaranteed.

Figure 8:
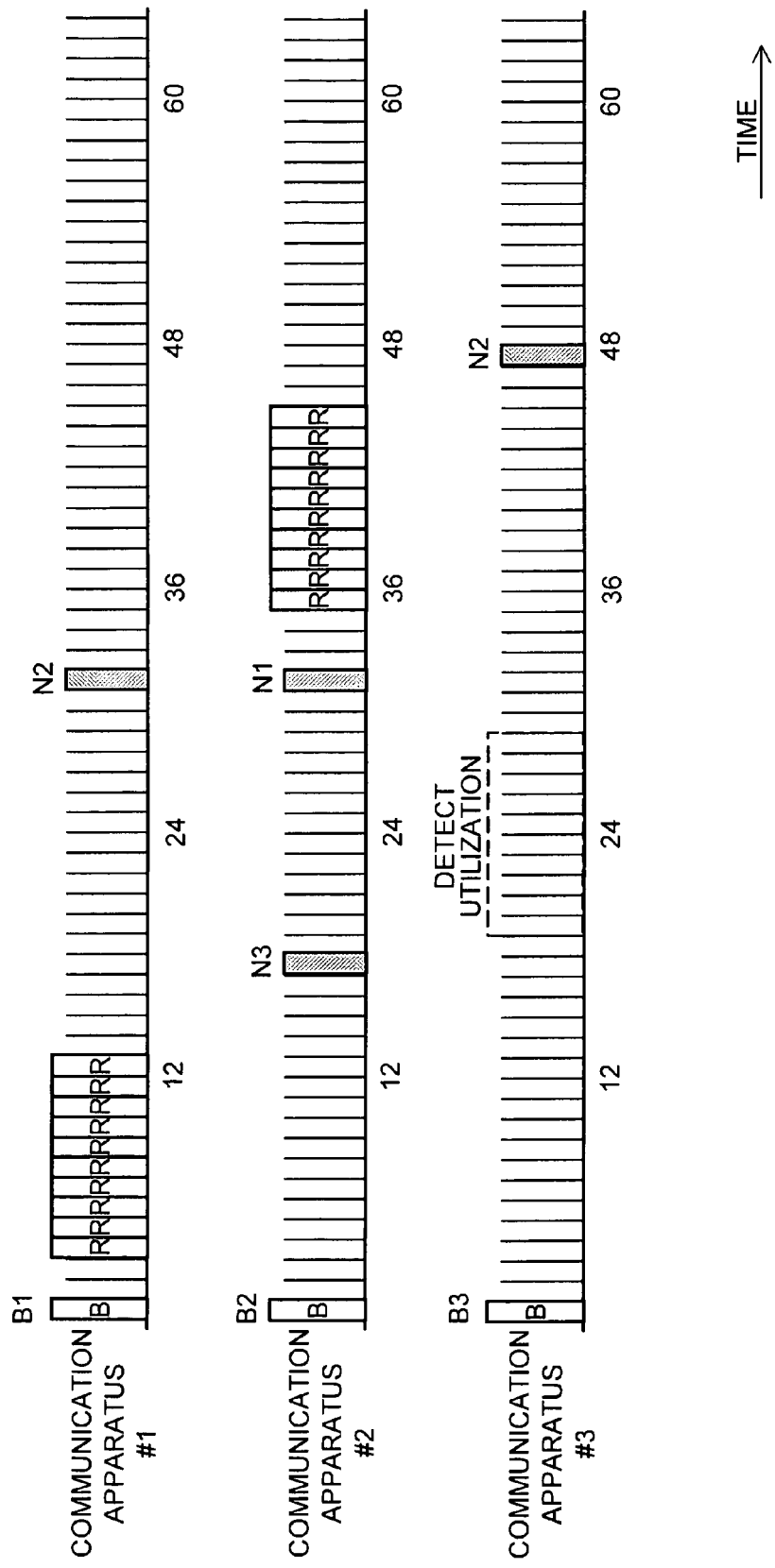
FIG. 8 is a view showing an example of arrangement of slots recognized by each communication apparatus itself when performing a reservation communication.

A superframe period is constituted by a plurality of slots and a slot is a minimum unit of access. FIG. 8 shows an example of arrangement of slots recognized by each communication apparatus itself when performing a reservation communication. With reference to its own superframe period, the wireless communication apparatus arranges the slots in terms of a relative position at which a beacon signal is received from a neighboring communication apparatus (as described above).

It is shown that the communication apparatus #1 receives a beacon from the communication apparatus #2, at the 32nd position, with the own beacon transmission position being 0th position. It is shown that, with the own beacon transmission position being 0th position, the communication apparatus #2 receives a beacon from the communication apparatus #3, at the 18th position, and receives a beacon from the communication apparatus #1, at the 32nd position. It is shown that the communication apparatus #3 receives a beacon from the communication apparatus #2, at the 48th position, with the own beacon transmission position being 0th position.

Further, each communication apparatus notifies of a slot portion used for a reservation communication as in the case in which a beacon is received from another communication apparatus, thereby informing that a reservation communication is to be performed.

That is, it is shown that the transmitting-end communication apparatus #1 utilizes the 4th slot to the 13th slot for a reservation communication in terms of a relative position from its own beacon transmission position.

Similarly, it is shown that the receiving-end communication apparatus #2 utilizes the 36th slot to the 45th slot for a reservation communication in terms of a relative position from its own beacon transmission position.

In the illustrated example, for the sake of convenience, the transmitting-side and receiving-side communication apparatuses treat a reservation period as in the case of receiving a beacon signal from another communication apparatus and notify of the reservation period as in the case of receiving a beacon signal. With this arrangement, even a wireless communication apparatus that exists in a region to be a hidden terminal viewed from a transmitting-side communication apparatus can be notified that a bandwidth-guaranteed communication is being performed. Through the use of utilization-recognition slot information (described below) described in existing beacon information, it is possible to notify of a slot utilized for a reservation communication.

The communication apparatus #3 that is located at a position so as to be a hidden terminal from the transmitting-end communication apparatus #1 analyzes utilization slot information described in a beacon transmitted from the receiving-end communication apparatus #2. By doing so, the communication apparatus #3 can recognize that there is a possibility that the 20th slot to the 29th slot, in terms of a relative position from its own beacon transmission position, are used for communication of neighboring communication apparatuses.

When neighboring communication apparatuses are notified of such a slot arrangement relationship as a parameter of utilization slot information through the use of a periodically transmitted beacon, it is possible to notify that a reservation communication is to be performed in an ad-hoc network.

When neighboring communication apparatuses are notified of such a slot arrangement relationship as a parameter of utilization slot information through the use of a periodically transmitted beacon, it is possible to notify that a reservation communication is to be performed in an ad-hoc network.

In this embodiment, an RTS/CTS system is employed as means for improving the quality of communication in a communication environment in which random access is performed based on the CSMA/CA in the ad-hoc network in which no controlling station is provided. That is, in this case, prior to transmission of substantial information, a transmitting-end communication apparatus transmits an RTS (Request to Send: a transmission request) and a receiving-end communication apparatus receives the RTS. When data is receivable, the receiving-end communication apparatus returns a CTS (Clear to Send: a reception preparation completion) as a response to the RTS. After a connection is established through the RTS/CTS information exchange between the apparatuses, data transmission is executed.

Figure 9:
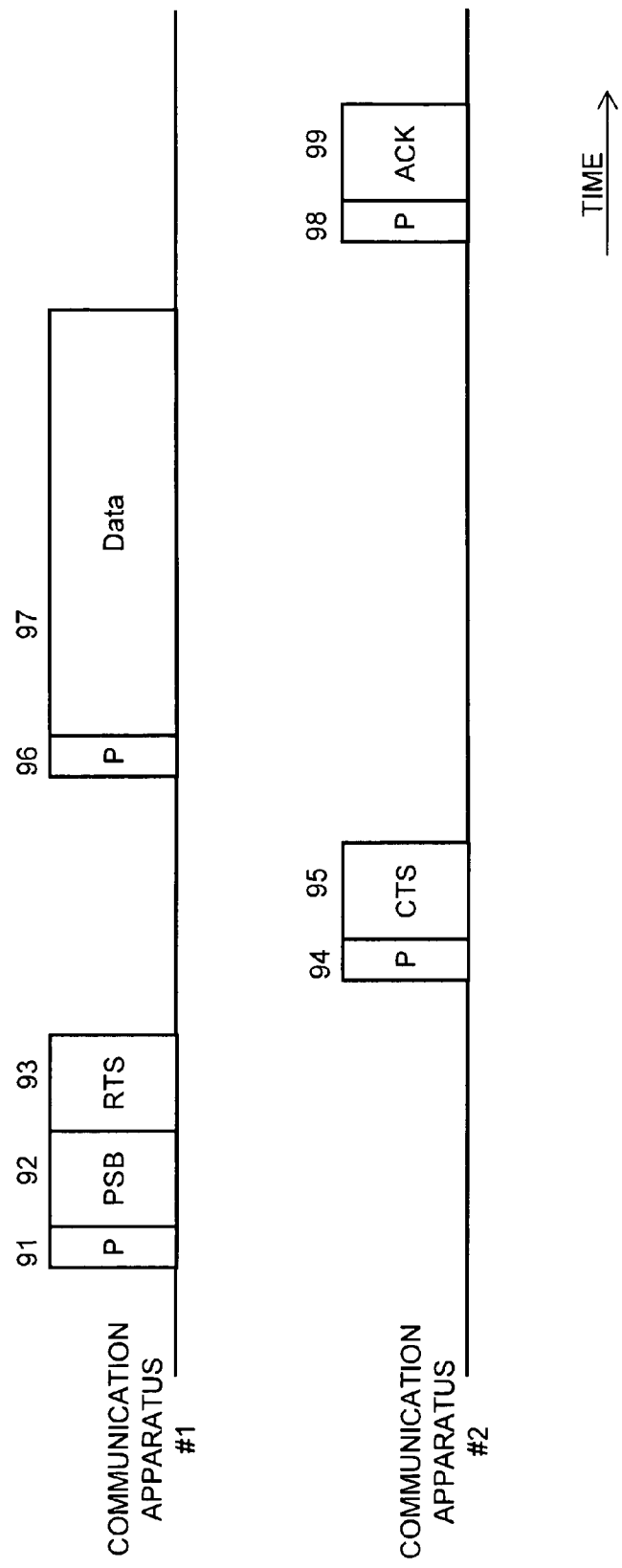
FIG. 9 is a diagram showing an example of a sequence of communication in a reservation period.

FIG. 9 shows an example of a sequence of communication in a reservation period. The example shown in this figure illustrates a sequence for a case in which the transmitting-end communication apparatus #1 performs a reservation communication to the receiving-end communication apparatus #2. In a reservation period, however, data transmission is executed after the exchange of RTS/CTS information.

When a reservation period arrives, the transmitting-end communication apparatus #1 confirms that another wireless communication apparatus is not communicating. Thereafter, the transmitting-end communication apparatus #1 transmits a predetermined preamble signal (P) 91 and then transmits a pseudo beacon (PSB) 92 and a transmission request (RTS) 93. The pseudo beacon is transmitted in order to cause the transmitting-side and receiving-side communication apparatuses to treat a reservation period as in the case of receiving a beacon signal from another communication apparatus and to notify of the reservation period as in the case of receiving a beacon signal.

While not shown here, when other wireless communication apparatuses communicate with each other, the communication apparatus #1 performs control for restraining the transmission of a signal until the communication is completed.

In the RTS, the communication apparatus #2 that is a receiving end of information when a reservation communication is performed is specified (described below). Upon receiving the RTS, the receiving-end communication apparatus #2 recognizes that communication is to be performed later and returns a predetermined preamble (P) 94 and then a reception preparation completion (CTS) 95.

While not shown here, when other wireless communication apparatuses communicate with each other, the communication apparatus #2 may perform control for, for example, restraining the transmission of a signal until the communication is completed.

In response to the CTS signal, the transmitting-end communication apparatus #1 starts transmission of a predetermined preamble signal (P) 96 and then transmission of data (data) 97 to the information-receiving-end communication apparatus #2.

Further, the receiving-end communication apparatus #2 receives the data. When the data reception is finished, the receiving-end communication apparatus #2 also returns a predetermined preamble signal (P) 98 and then returns a reception acknowledgement (ACK) 99 as required.

Based on the reception acknowledgement (ACK) 99 transmitted from the receiving-end communication apparatus #2, the transmitting-end communication apparatus #1 can recognize that the series of information transmissions has been completed.

FIG. 10 shows an example of the frame structure of a beacon signal. In this embodiment, each communication apparatus that operates in the ad-hoc network transmits a beacon signal in the beginning of its own superframe period.

The illustrated beacon frame includes a type indicating that transmitted information is beacon information, a length indicating the information length of the frame, a MAC address that serves as the address information of a transmitting-end, a timing indicating timing information of transmission, a network ID indicating a group to which a corresponding communication apparatus belongs, an error detection code CRC (which is attached as required) up to this portion, utilization-recognition slot information that notifies of parameters such as a reservation communication according to the present invention, and an error detection code CRC of the entire frame.

As described above, in the utilization-recognition slot information, a reservation period is treated as in the case of receiving a beacon signal from another communication apparatus and is described as in the case of receiving a beacon signal. A communication apparatus that has received and analyzed a beacon signal can detect a slot to be utilized for a reservation communication. The communication apparatus then restrains communication using the reserved slot, so that collision and interference are avoided and a bandwidth is guaranteed during the reservation communication.

FIG. 11 shows an example of the frame structure of reservation request command information. When equipment connected with a reservation-communication-transmitting-end communication apparatus issues a reservation instruction, a reservation request command is transmitted to a receiving-side communication apparatus (see FIG. 5).

The illustrated command frame includes a type indicating that transmitted information is a reservation request command, a length indicating the information length of the frame, a receiving-end MAC address that serves as the address information of a receiving end, a transmitting-end MAC address that serves as the address information of a transmitting end, a command that describes parameters specific to the command, an error detection code CRC that is attached as required and that indicates an error up to this point, request slot information that conveys a request for a reservation communication according to the present invention, and an error detection code CRC of the entire frame.

FIG. 12 shows an example of the frame structure of acknowledgement-notification command information. An acknowledgement-notification command is transmitted by a receiving-end communication apparatus in response to a reservation request from a communication apparatus that serves as a transmitting end of reservation communication (see FIG. 5).

The illustrated command frame includes a type indicating that transmitted information is an acknowledgement-notification command, a length indicating the information length of the frame, a receiving-end MAC address that serves as the address information of a receiving end, a transmitting-end MAC address that serves as the address information of a transmitting end, a command that describes parameters specific to the command, an error detection code CRC that is attached as required and that indicates an error up to this point, utilization slot information that indicates a position utilized for a reservation communication according to the present invention, and an error detection code CRC of the entire frame.

In the utilization slot information, a reservation period is treated as in the case of receiving a beacon signal from another communication apparatus and is described as in the case of receiving a beacon signal (as described above).

FIG. 13 shows an example of the frame structure of reservation notification command information. A reservation notification command is transmitted from a receiving-end communication apparatus to a transmitting-end communication apparatus when the receiving end issues a request for a reservation communication (see FIG. 6).

FIG. 13 shows an example of the frame structure of reservation notification command information. A reservation notification command is transmitted from a receiving-end communication apparatus to a transmitting-end communication apparatus when the receiving end issues a request for a reservation communication (see FIG. 6).

In the utilization slot information, a reservation period is treated as in the case of receiving a beacon signal from another communication apparatus and is described as in the case of receiving a beacon signal (as described above).

FIG. 14 shows an example of the frame structure of the pseudo beacon. The pseudo beacon signal is transmitted from a transmitting-end communication apparatus when a reservation period arrives. The pseudo beacon is transmitted in order to cause the transmitting-side and receiving-side communication apparatuses to treat a reservation period as in the case of receiving a beacon signal from another communication apparatus and to notify of the reservation period as in the case of receiving a beacon signal.

The illustrated pseudo-beacon frame includes a type indicating that transmitted information is a pseudo beacon, a length indicating the information length of the frame, a MAC address that serves as the address information of a transmitting end, a timing indicating timing information of transmission, a network ID indicating a group to which a corresponding communication apparatus belongs, and an error detection code CRC of the entire frame.

FIG. 15 shows an example of the frame structure of the RTS command.

The illustrated RTS command frame includes a type indicating that transmitted information is an RTS command, a length indicating the information length of the frame, a receiving-end MAC address that serves as the address information of a receiving end, a transmitting-end MAC address that serves as the address information of a transmitting end, an RTS parameter that describes a parameter specific to the command, and an error detection code CRC of the entire frame.

FIG. 16 shows an example of the frame structure of the CTS command.

The illustrated CTS command frame includes a type indicating that transmitted information is a CTS command, a length indicating the information length of the frame, a receiving-end MAC address that serves as the address information of a receiving end, a transmitting-end MAC address that serves as the address information of a transmitting end, a CTS parameter that describes a parameter specific to the command, and an error detection code CRC of the entire frame.

FIG. 17 shows an example of the frame structure of a data frame.

The illustrated data frame includes a type indicating that transmitted information is data, a length indicating the information length of the frame, a receiving-end MAC address that serves as the address information of a receiving end, a transmitting-end MAC address that serves as the address information of a transmitting end, an attribute that describes the attribute of the data, an error detection code CRC that is attached as required and that indicates an error up to this point, data payload information containing actual data, and an error detection code CRC of the entire frame.

FIG. 18 shows an example of the frame structure of the ACK frame.

FIG. 18 shows an example of the frame structure of the ACK frame.

Figure 19:
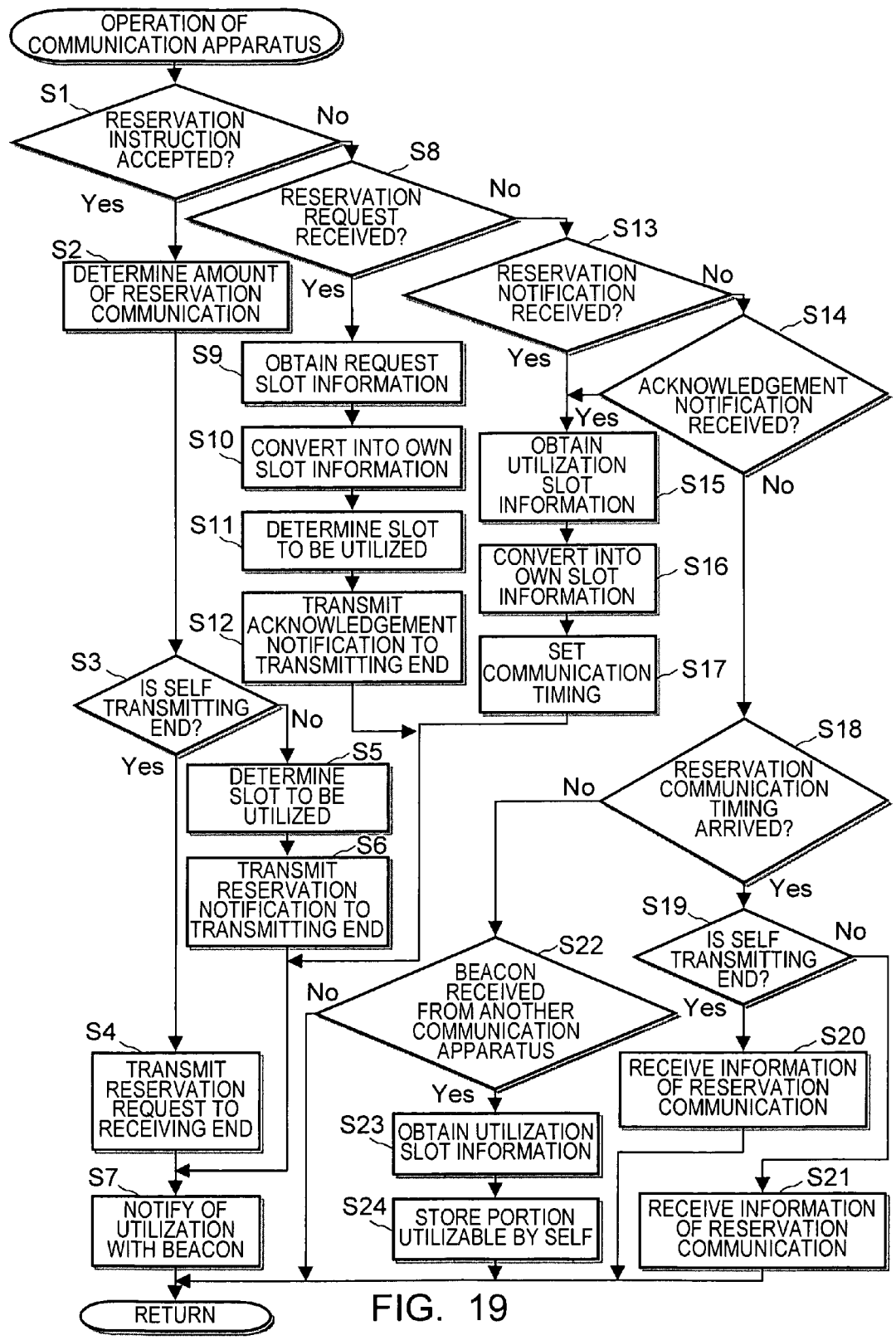
FIG. 19 is a flow chart showing operational procedures of a wireless communication apparatus in the ad-hoc network according to the present invention.

FIG. 19 shows operational procedures of a wireless communication apparatus in the ad-hoc network according to the present invention in a flow chart form.

First, a determination is made as to whether or not a reservation instruction from equipment connected with a wireless communication apparatus via the interface is received (step S1). When a reservation instruction is accepted, the amount of communication required for the reservation communication is calculated (step S2). At this point, a determination is made as to whether or not the self is a transmitting end (step S3). When the self is a transmitting end, a reservation request command is transmitted to a receiving end (step S4). On the other hand, when the self is not a transmitting end, a slot to be utilized is determined (step S5) and a reservation notification command is transmitted to the transmitting end (step S6). Subsequently, a notification indicating the utilization of communication is issued using a beacon (step S7).

When a reservation instruction is not received in step S1, a determination is made as to whether or not a reservation request command is wirelessly received (step S8). When a reservation request command is received, request slot information described in the command is obtained (step S9). After the request slot information is converted into slot information of the self (step S10), a slot to be actually utilized for communication is determined (step S11) and an acknowledgement-notification command is returned to the transmitting-end communication apparatus (step S12). Subsequently, a notification indicating the utilization of communication is issued using a beacon (step S7).

When a reservation request command has not been received in step S8, a determination is made as to whether or not a reservation notification command is received (step S13) or a determination is made as to whether or not an acknowledgement-notification command is received (step S14). When the notification command(s) is received, utilization slot information described in the command is obtained (step S15). The utilization slot information is converted into slot information of the self (step S16) and then communication timing is set (step S17). Subsequently, a notification indicating the utilization of communication is issued using a beacon (step S7).

On the other hand, when neither of the reservation notification command nor the acknowledgement-notification command is received, a determination is further made as to whether reservation communication timing has arrived (step S18). Then, in a case in which the reservation communication timing has arrived, when the self is a transmitting end (step S19), information for the reservation communication is transmitted (step S20). When the self is not a transmitting end, information for the reservation communication is received (step S21).

When the reservation communication timing has not arrived in step S18, a determination is made as to whether or not a beacon signal from another communication apparatus is received (step S22). When a beacon signal is received, utilization slot information described therein is obtained (step S23), and a portion (slot) of the information which can be utilized by the self for communication is stored in the information storage 102 (step S24).

Second Embodiment

In the first embodiment described above according to the present invention, each of a transmitting-end communication apparatus and a receiving-end communication apparatus sets a reservation period in its own superframe and uses a beacon signal to notify the neighboring communication apparatuses about the position information of slots associated with the reservation period. Each communication apparatus restrains a communication operation in the reservation period set by another communication apparatus, thereby preventing communication collision and interference. Thus, this arrangement can achieve isochronous communication based on band reservation in an ad-hoc network and can guarantee a bandwidth during the transmission of isochronous data such as AV content.

However, a reservation period is an exclusive time period and thus a transmission path is exclusively occupied by specific communication apparatuses. In a method for performing communication by exclusively occupying a transmission path over a predetermined communication band (time), when isochronous communication that does not fill a predetermined communication band (time) that has been once set is performed, the insufficient portion cannot be used for communication between other communication apparatuses and thus the throughput decreases.

On the other hand, in an access control method based on the CSMA/CA, communication is started when a carrier signal is not detected. Thus, there is no guarantee that transmission path is exclusively occupied and utilized for a specific communication.

Accordingly, in a second embodiment of the present invention, a wireless communication apparatus, which is included in a ad-hoc network in which individual communication stations forms a network in an autonomous distributed manner without the relationship of a controlling station and a controlled station, sets a period (timing) usable by the self with priority and performs isochronous communication in the priority utilization period as required.

The priority utilization period is a period that a communication apparatus can utilize with priority and is different from a reservation period in which a communication apparatus that has made a reservation exclusively uses a transmission path. Thus, while a communication apparatus sets a period utilizable with priority to perform an isochronous communication, arbitrary communication between other communication apparatuses is permitted when that isochronous communication has not been performed or the isochronous communication has been finished.

Even in a case in which the self has set a period utilizable with priority, when another communication is performed, the start of an isochronous communication is temporarily delayed and transmission is performed after the communication is finished. In this case, it is possible to achieve an isochronous communication that coexists with another communication. Also, while the start of a priority utilization period is temporarily delayed, it can be expected that the throughput is improved in terms of the entire system and the temporary delay is recovered. This is because the priority utilization state, i.e., the priority utilization of a band, is automatically released when an isochronous communication that does not fill the priority utilization period is performed.

Figure 20:
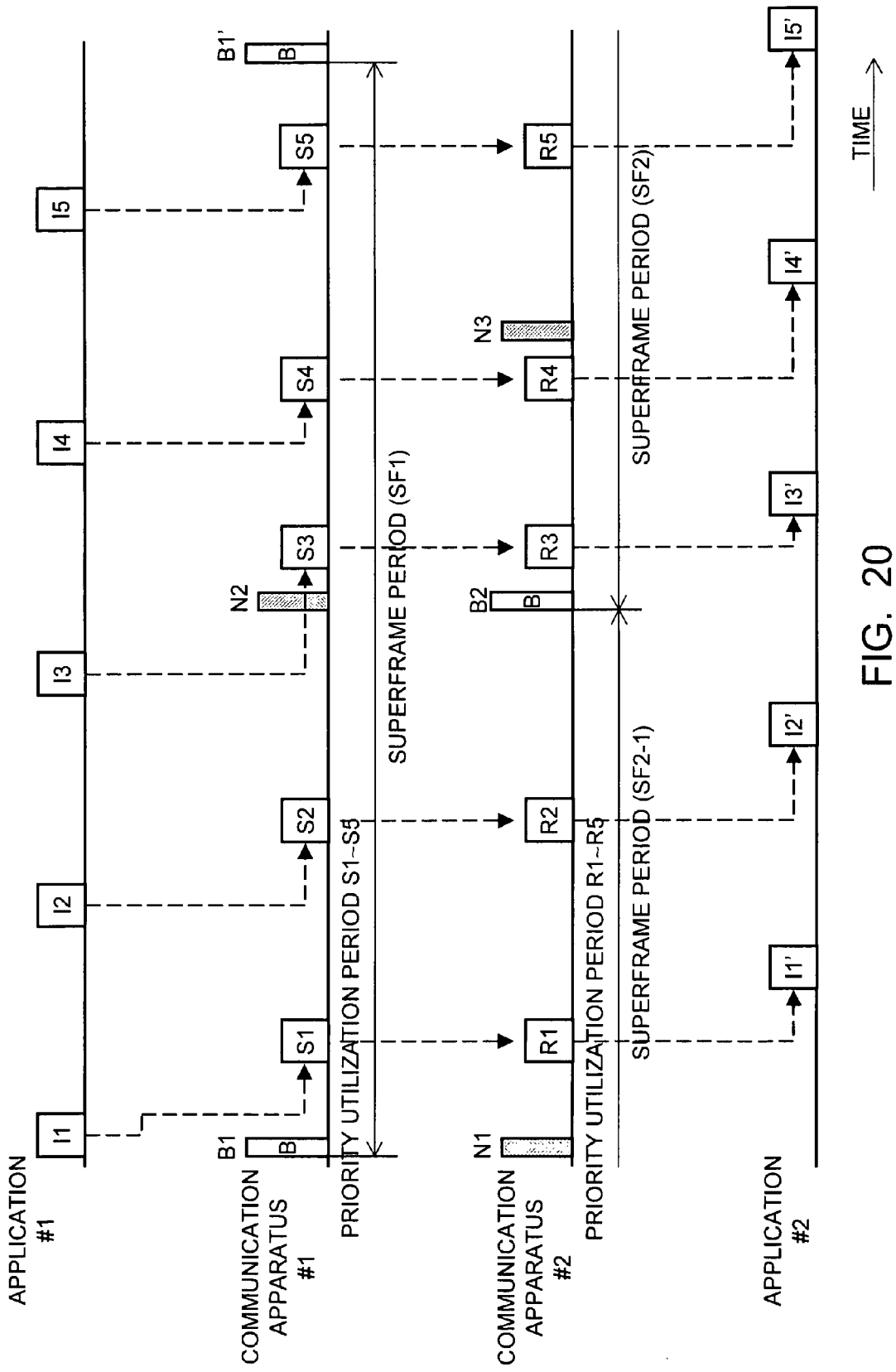
FIG. 20 is a diagram showing a state in which each communication apparatus arranges a priority utilization period in its own superframe in the ad-hoc network according to the present invention.

FIG. 20 shows a state in which each communication apparatus arranges priority utilization periods in its own superframe in the ad-hoc network according to this embodiment.

The communication apparatus #1 that serves as a transmitting end arranges priority utilization periods S1 to S5 in a superframe period SF1 defined by beacon signals B1 and B1', in accordance with isochronous information I1 to I5 transmitted from an application #1 of equipment connected via the interface 101.

In the example shown in the figure, priority utilization periods are set at a period that is synchronized with the isochronous information that arrives almost periodically. However, since the priority utilization periods S1 to S5 for transmission are set so as to avoid timing at which a beacon signal from another communication apparatus is received, the priority utilization periods are not necessarily arranged at regular intervals.

On the other hand, the communication apparatus #2 that serves as a receiving end of isochronous communication receives data transmitted at timings R1 to R5 that are synchronized with the priority utilization periods of the transmitting-end communication apparatus #1. The communication apparatus #2 delivers the data, as isochronous information I1' to I5', to an application #2 of the equipment connected via the interface 101, while considering a predetermined amount of transmission delay.

In this case, similarly to the transmitting-end communication apparatus #1, the communication apparatus #2 may set, as priority utilization periods for reception, R1 to R5 in a superframe period SF2 defined by a beacon signal B2.

Priority utilization periods are continuously set for each superframe period until an isochronous communication is finished. When a new wireless communication apparatus appears in the vicinity, the priority utilization periods may be rearranged, for example, by shifting so as to avoid beacon transmission timing of the communication apparatus.

Figure 21:
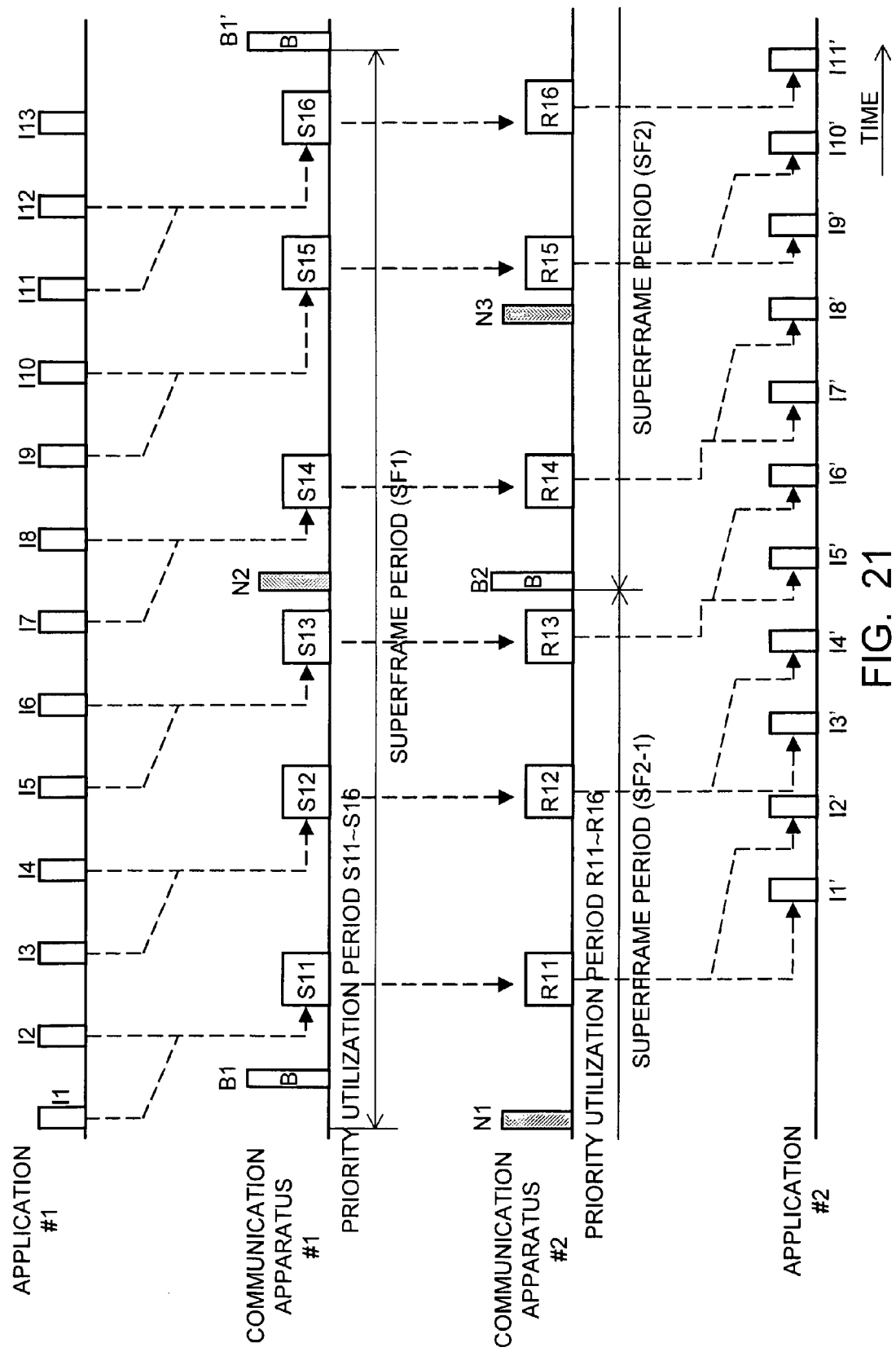
FIG. 21 is a diagram showing a state in which a plurality of pieces of isochronous information are gathered to provide a priority utilization period.

In the example shown in FIG. 20, although the priority utilization periods are arranged for each piece of isochronous information, a plurality of pieces of isochronous information may be gathered so as to arrange one priority utilization period. FIG. 21 shows a state in which a plurality of pieces of isochronous information are gathered to arrange a priority utilization period.

The transmitting-end communication apparatus #1 arranges priority utilization periods S11 to S16 for transmission in a superframe period SF1 defined by beacon signals B1 and B1', in accordance with isochronous information I1 to I13 transmitted from an application #1 of equipment connected via the interface 101.

In the illustrated example, the priority utilization period S11 is arranged for a plurality of pieces of isochronous information I1 to I2, and thereafter, the priority utilization period S12 is sequentially arranged for the isochronous information I3 and I4.

As in the case shown in FIG. 20, priority utilization periods are set at a period that is synchronized with a plurality of pieces of isochronous information which arrive almost periodically. However, since the priority utilization periods S11 to S16 for transmission are set so as to avoid timing at which a beacon signal from another communication apparatus is received, the priority utilization periods are not necessarily arranged at regular intervals.

On the other hand, the communication apparatus #2 that serves as a receiving end of isochronous communication receives data transmitted at timings R11 to R16 that are synchronized with the priority utilization periods of the transmitting-end communication apparatus #1. Thus, the communication apparatus #2 delivers the data, as a plurality of pieces of isochronous information I1' to I12', to an application #2 of the equipment connected via the interface 101, while considering a predetermined amount of transmission delay.

In this case, similarly to the transmitting-end communication apparatus #1, the communication apparatus #2 may set, as priority utilization periods for reception, R11 to R16 in a superframe period SF2 defined by a beacon signal B2.

Priority utilization periods are continuously set for each superframe period until an isochronous communication is finished. When a new wireless communication apparatus appears in the vicinity, the priority utilization periods may be rearranged, for example, by shifting so as to avoid beacon transmission timing of the communication apparatus.

Figure 22:
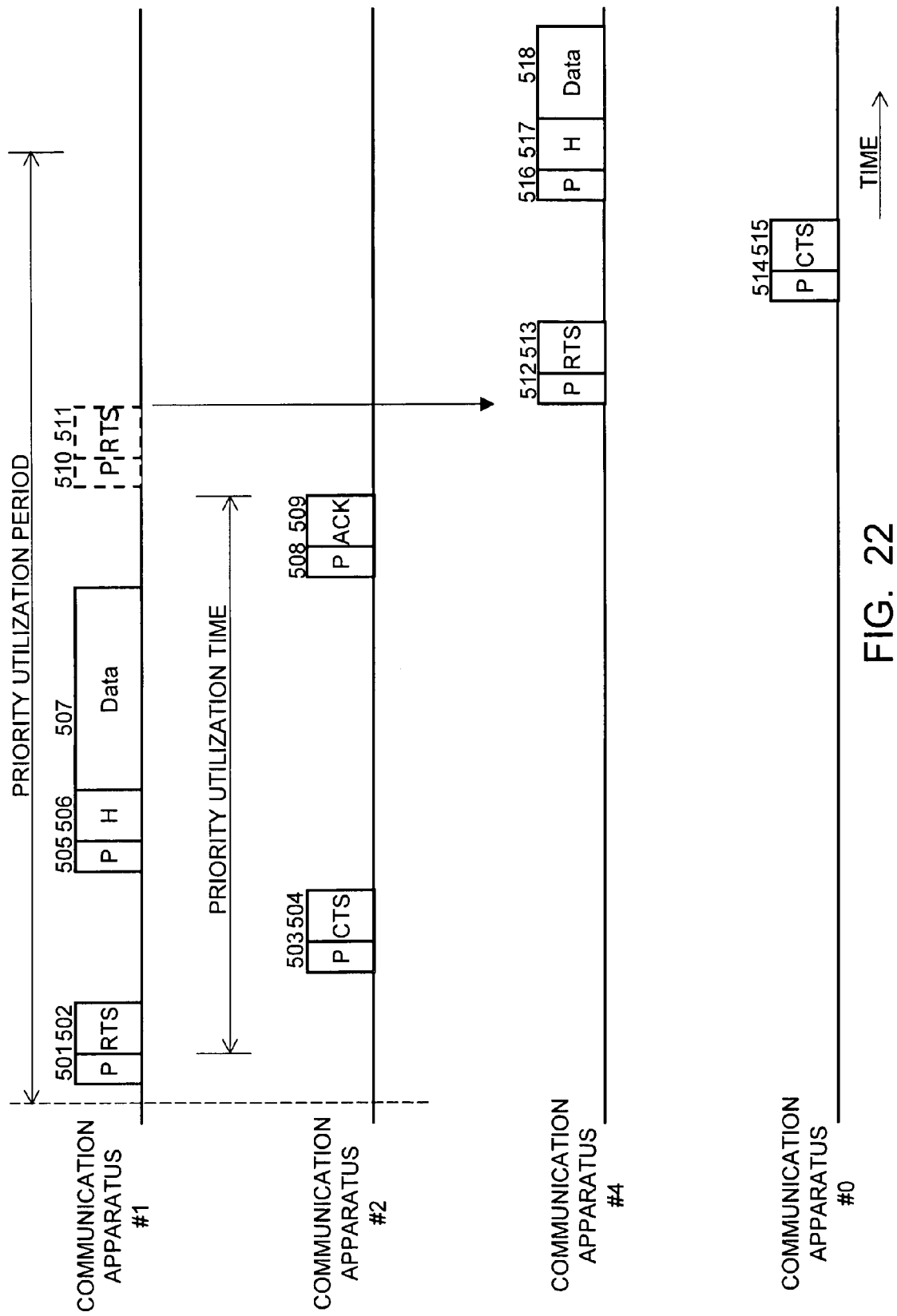
FIG. 22 is a diagram showing an example of a sequence of communication in a priority utilization period.

FIG. 22 shows an example of a sequence of communication in a priority utilization period. The example shown in this figure illustrates a sequence for a case in which the transmitting-end communication apparatus #1 transmits/receives isochronous information to/from the receiving-end communication apparatus #2 by utilizing a priority utilization period. After the transmitting-end communication apparatus #1 and the receiving-end communication apparatus #2 finish the priority utilization of the priority utilization period, the neighboring communication apparatuses #4 and #0 perform ordinary random access based on a CSMA/CA system. Each communication apparatus executes data transmission after exchanging RTS/CTS information, in order to improve the quality of communication.

First, when another communication is not performed in the priority utilization period, the communication apparatus #1 that serves as a transmitting end transmits a predetermined synchronization-signal preamble (P) 501 and a transmission request (RTS) 502 to the communication apparatus #2 that serves as a receiving end. In this case, upon transmission of the RTS, priority utilization time is started in the priority utilization period.

The communication apparatus #2 receives the RTS, and when the data communication is possible, the communication apparatus #2 returns a predetermined synchronization-signal preamble (P) 503 and a reception preparation completion (CTS) 504 to the communication apparatus #1.

The communication apparatus #2 receives the RTS, and when the data communication is possible, the communication apparatus #2 returns a predetermined synchronization-signal preamble (P) 503 and a reception preparation completion (CTS) 504 to the communication apparatus #1.

Further, when the data was successively received, the communication apparatus #2 returns a reception acknowledgement (ACK) 509 together with a predetermined synchronization-signal preamble (P) 508. In this case, although an example of a sequence configuration for receiving the ACK immediately after the data transmission is illustrated for the sake of convenience, the reception acknowledgement ACK may be returned when necessary.

Subsequently, when there is communication with another communication apparatus, the communication apparatus #1 that has set the priority utilization time can transmit/receive data by transmitting a preamble 510 and a transmission request (RTS) 511 again, as required.

At this point, when the communication apparatus #1 does not perform communication, the setting of the priority utilization time is cleared, so that other communication apparatuses #4 and #0 can communicate with each other without undergoing any special procedure.

That is, even in the priority utilization period, when the communication apparatus #4 does not receive the preamble (P) 510, the header information (H) 511, and so on from the communication apparatus #1, the communication apparatus #4 determines that the priority utilization time has finished. Then, in order communicate to the communication apparatus #0, the communication apparatus #4 transmits a predetermined synchronization-signal preamble (P) 512 and a transmission request (RTS) 513 to the communication apparatus #0.

The communication apparatus #0 receives the RTS, and when the data communication is possible, the communication apparatus #0 returns a predetermined synchronization-signal preamble (P) 514 and a reception preparation completion (CTS) 515 to the communication apparatus #4.

Upon receiving the CTS, the transmitting-end communication apparatus #4 transmits a predetermined synchronization-signal preamble (P) 516, header information (H) 517, and a data payload (Data) 518 to the communication apparatus #0.

The priority utilization period is a period that a communication apparatus can utilize with priority and is different from a reservation period in which a communication apparatus that has made a reservation exclusively uses a transmission path. Thus, while a communication apparatus sets a period utilizable with priority to perform an isochronous communication, ordinary random access is permitted based on a CSMA/CA system when that isochronous communication is not performed or the prioritized isochronous communication has been finished in the priority utilization period. Accordingly, even when isochronous communication that does not fill a priority utilization period that has been once set is performed, the insufficient portion can instead be used for communication between other communication apparatuses, thus improving the throughput.

Figure 23:
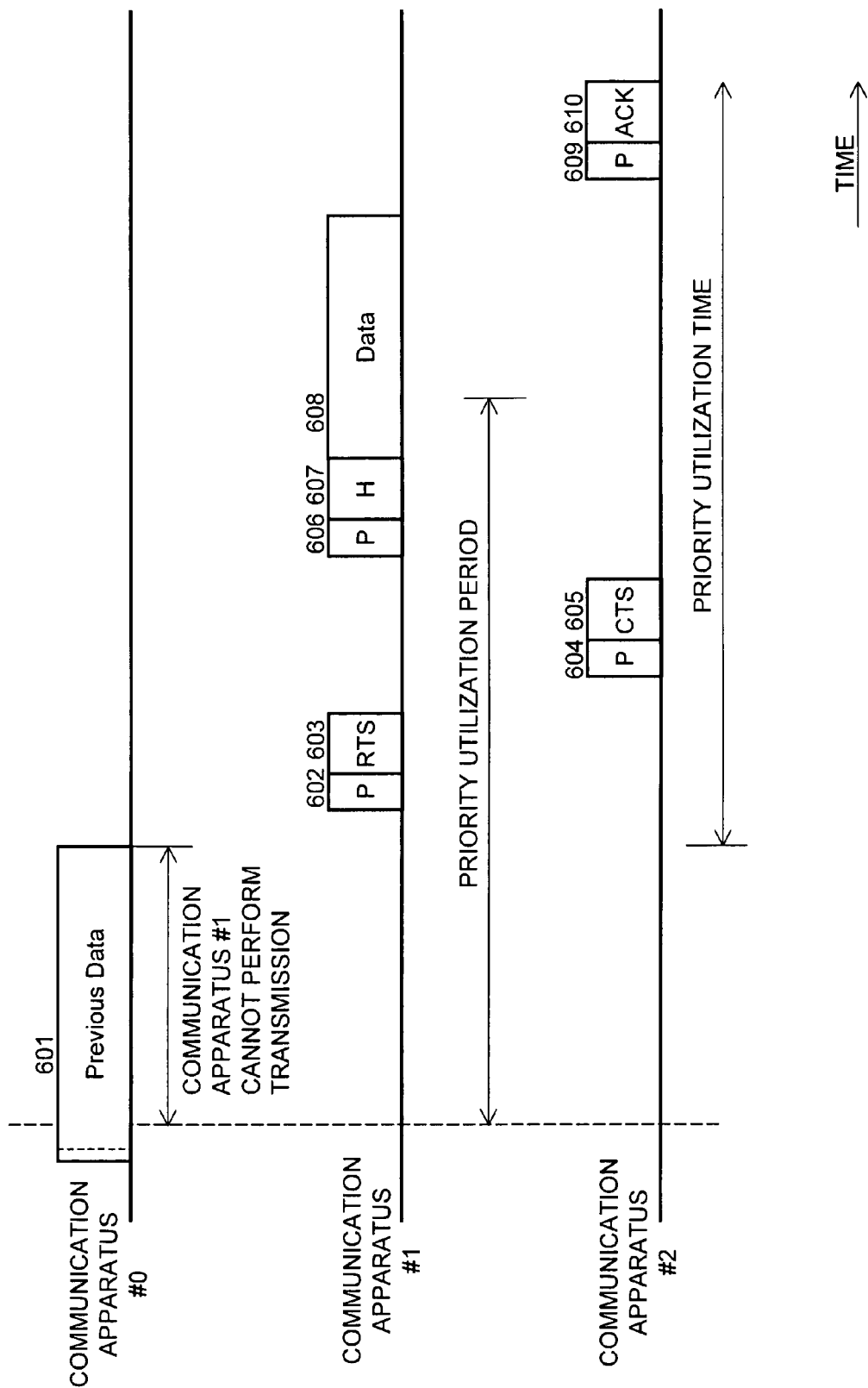
FIG. 23 is a diagram showing another example of a sequence of communication in a priority utilization period.

FIG. 23 shows another example of a sequence of communication in a priority utilization period. The example shown in this figure illustrates a sequence for a case in which the transmitting-end communication apparatus #1 transmits/receives isochronous information to/from the receiving-end communication apparatus #2 by utilizing a priority utilization period. In a case in which another communication is still being performed at a point of time when a priority utilization period set by the self arrives, the start of an isochronous communication is temporarily delayed and transmission is performed after the communication finishes.

First, when a communication (previous data) 601 from another communication apparatus #0 is performed in a priority utilization period, the communication apparatus #1 that serves as a transmitting end sets the period as transmission disabled time until that communication finishes. Alternatively, the communication apparatus #1 may perform a reception operation in advance prior to the priority utilization period so as to be able to recognize the communication duration time of the previous data 601 in advance.

Then, when the transmission disabled time ends, the communication apparatus #1 transmits a predetermined synchronization-signal preamble (P) 602 and a transmission request (RTS) 603 to the communication apparatus #2 that serves as a receiving end. In this case, upon the transmission of the RTS, the priority utilization time in the priority utilization period is started.

The communication apparatus #2 receives the RTS, and when the data communication is possible, the communication apparatus #2 returns a predetermined synchronization-signal preamble (P) 604 and a reception preparation completion (CTS) 605 to the communication apparatus #1.

In response to the CTS, the transmitting-end communication apparatus #1 transmits a predetermined synchronization-signal preamble (P) 606, header information (H) 607, and a data payload (Data) 608 to the communication apparatus #2.

Further, when the data was successively received, the communication apparatus #2 returns a predetermined synchronization-signal preamble (P) 609 and a reception acknowledgement (ACK) 610 to the communication apparatus #1. In this case, although an example of a sequence configuration for receiving the ACK immediately after the data transmission is illustrated for the sake of convenience, the reception acknowledgement ACK may be returned when necessary.

In a case in which another communication is being performed at a point of time when a priority utilization period set by the self arrives, the start of an isochronous communication is temporarily delayed, and a transmission based on the priority utilization is performed after that communication finishes. This can realize an isochronous communication that coexists with another communication. In this case, the start of the priority utilization period is temporarily delayed. When isochronous communication that does not fill the priority utilization period is performed, it can be expected that the throughput is improved in terms of the entire system and the temporary delay is recovered, since the priority utilization state, i.e., a band, is released (see FIG. 22).

For convenience, FIGS. 22 and 23 show an example of procedures for starting data communication after the transmission request RTS and the reception preparation completion CTS are exchanged. Alternatively, the communication sequence may be configured so as to directly start data communication without going through the RTS/CTS exchange procedures.

Figure 24:
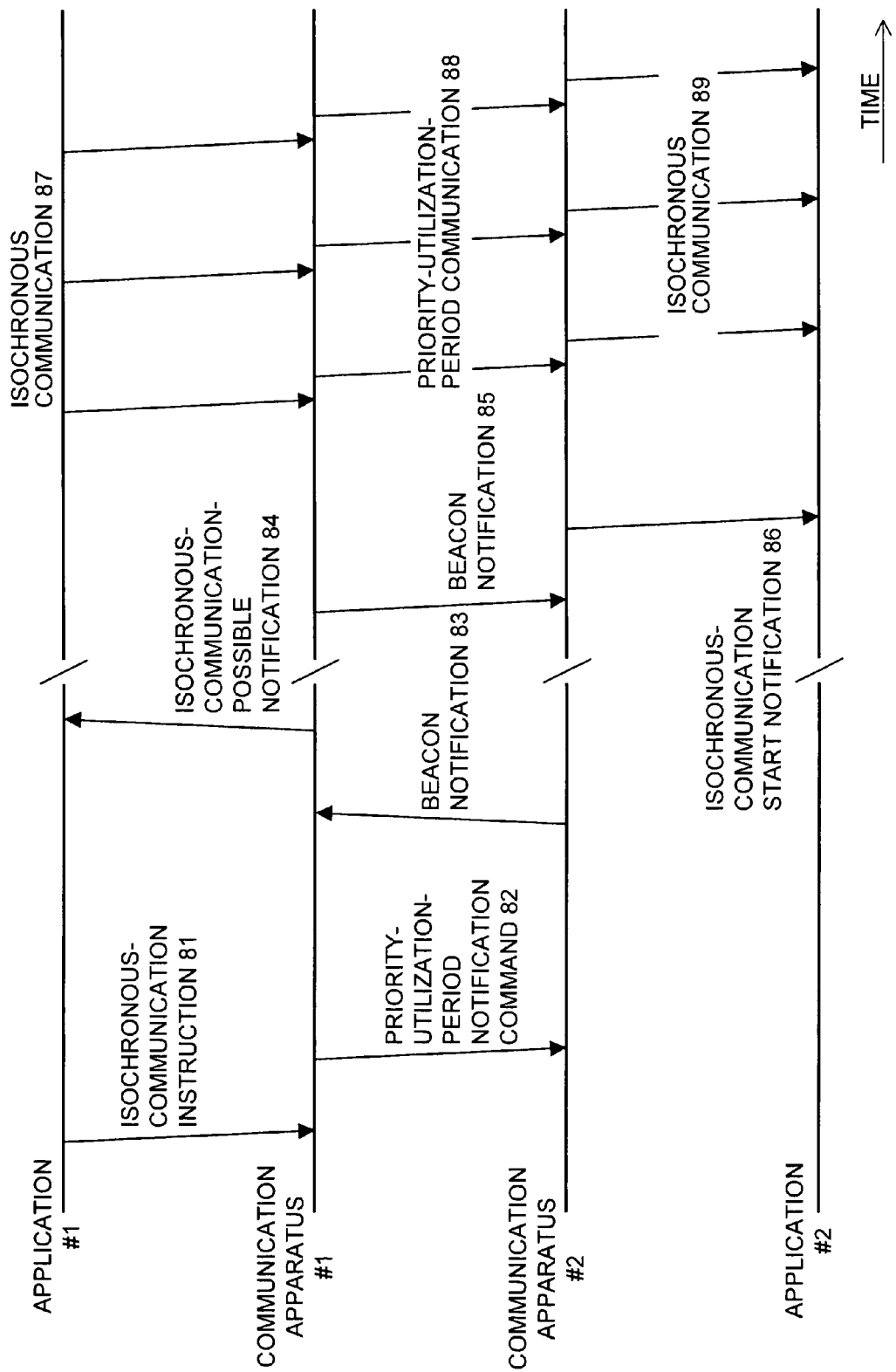
FIG. 24 is a diagram showing a communication sequence for exchanging a priority utilization period between communication apparatuses that perform isochronous communication.

FIG. 24 shows a communication sequence for exchanging a priority utilization period between communication apparatuses that perform isochronous communication.

In the illustrated example, the application #1 that performs an isochronous communication notifies the central controller 103 via the interface 101 of the transmitting-end wireless communication apparatus #1 about parameter information, as an isochronous communication instruction 81, for the isochronous communication.

In response to the isochronous communication notification, the wireless communication apparatus #1 transmits a priority-utilization-period notification command 82 to the receiving-end wireless communication apparatus #2.

Subsequently, in response to the priority-utilization-period notification command 82, the receiving-end wireless communication apparatus #2 stores priority-utilization-period information utilizable by the self in the information storage 113. The wireless communication apparatus #2 also describes the priority-utilization-period information in a beacon notification 83 and transmits the beacon notification 83 to wireless communication apparatuses that exist in the neighbor.

Upon receiving the beacon notification 83, the wireless communication apparatus #1 issues a notification 84 indicating that an isochronous communication has become possible to the application #1. Further, the wireless communication apparatus #1 stores the priority-utilization-period information used for the isochronous communication in the information storage 113. The wireless communication apparatus #1 also describes the priority-utilization-period information in a beacon notification 85 and transmits the beacon notification 85 to wireless communication apparatuses that exist in the neighbor.

The wireless communication apparatus #2 receives the beacon notification 85, and issues a notification 86 indicating the start of the isochronous communication to an application #2 that serves as a receiving end. At this point, the setting of the priority utilization period in a superframe is completed.

Subsequently, an isochronous communication using the priority utilization period is started. That is, the application #1 continuously starts an isochronous communication 87 to the wireless communication apparatus #1. Further, the wireless communication apparatus #1 continuously performs a priority-utilization-period communication 88, within the previously-set priority utilization period, to the wireless communication apparatus #2.

The wireless communication apparatus #2 then continuously performs an isochronous communication 89 to the application #2.

Figure 25:
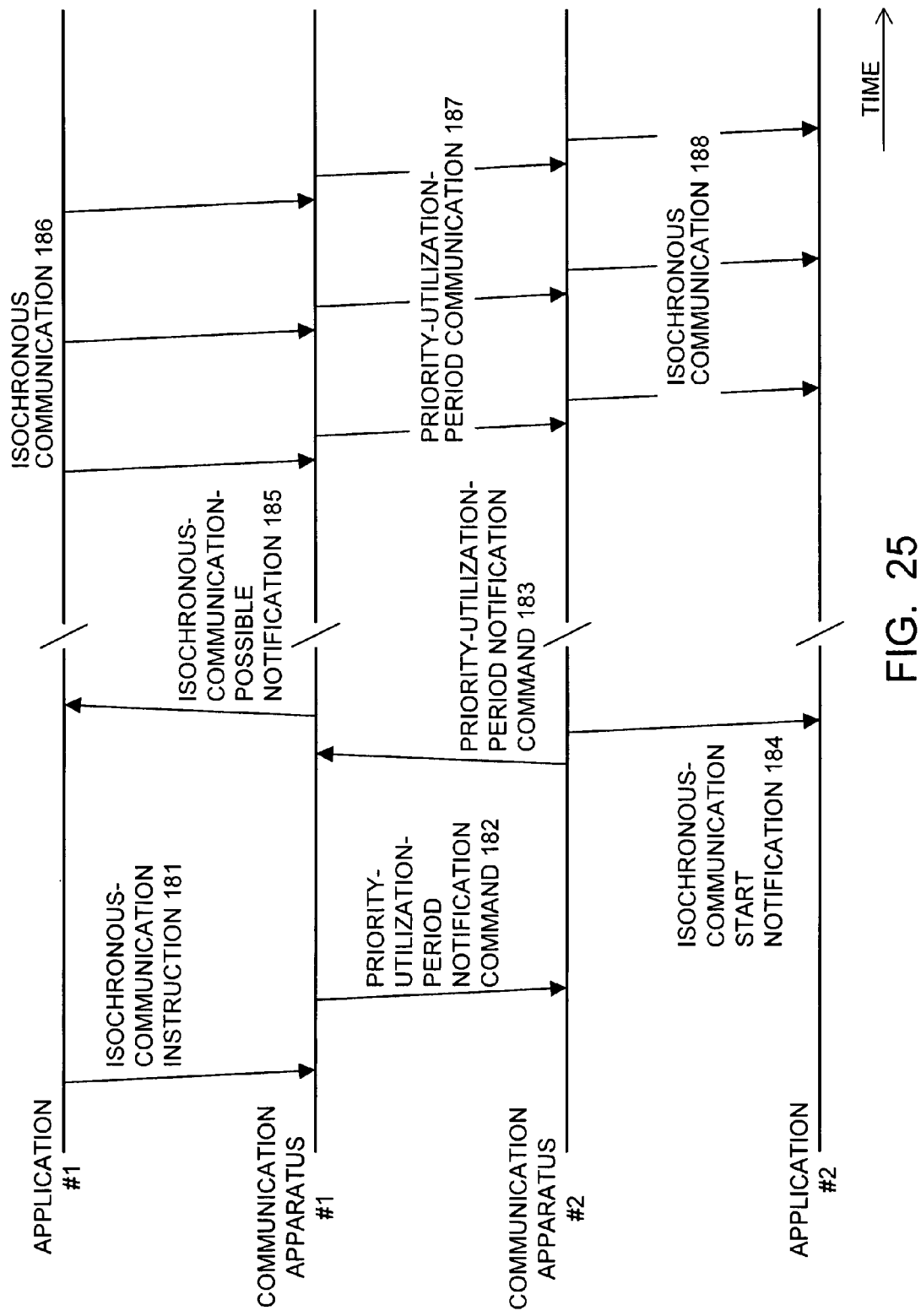
FIG. 25 is a diagram showing another example of the communication sequence for exchanging a priority utilization period between communication apparatuses that perform isochronous communication.

FIG. 25 shows another example of a communication sequence for exchanging a priority utilization period between communication apparatuses that perform isochronous communication. In this case, the receiving-end communication apparatus is adapted to exchange priority-utilization-period information by using a priority-utilization-period notification command instead of a beacon.

In the illustrated example, the application #1 that performs an isochronous communication notifies the central controller 103 via the interface 101 of the transmitting-end wireless communication apparatus #1 about parameter information, as an isochronous communication instruction 181, for the isochronous communication.

In response to the notification, the wireless communication apparatus #1 transmits a priority-utilization-period notification command 182 to the wireless communication apparatus #2 that serves as a receiving end.

In response to the priority-utilization-period notification command 182, the receiving-end wireless communication apparatus #2 stores priority-utilization-period information utilizable by the self in the information storage 113. The wireless communication apparatus #2 also transmits the priority-utilization-period information to the transmitting-end wireless communication apparatus #1 as a priority-utilization-period notification command 183. The wireless communication apparatus #2 then issues a notification 184 indicating the start of isochronous communication to an application #2 that serves as a receiving end.

In response to the priority-utilization-period notification command 183 from the wireless communication apparatus that serves as the receiving end, the wireless communication apparatus #1 issues a notification 185 indicating that an isochronous communication has become possible to the application #1 and also stores the priority utilization period used for the isochronous communication in the information storage 113.

Then, the application #1 continuously starts an isochronous communication 186 to the wireless communication apparatus #1. Further, the wireless communication apparatus #1 continuously performs a priority-utilization-period communication 187, within the previously-set priority utilization period, to the wireless communication apparatus #2.

The wireless communication apparatus #2 then continuously performs an isochronous communication 188 to the application #2.

FIG. 26 shows an example of the frame structure of beacon information.

The illustrated beacon frame includes a type indicating that transmitted information is beacon information, a length indicating the information length of the frame, a MAC address that serves as the address information of a transmitting-end, a timing indicating timing information of transmission, a network ID indicating a group to which a corresponding communication apparatus belongs, an error detection code CRC that is attached as required and that indicates an error up to this portion, priority-utilization-period information that notifies of parameters such as a priority-utilization-period communication according to the present invention, and an error detection code CRC of the entire frame.

FIG. 27 shows an example of the frame structure of the priority-utilization-period notification command.

The illustrated command frame includes a type indicating that transmitted information is a priority-utilization-period notification command, a length indicating the information length of the frame, a receiving-end MAC address that serves as the address information of a receiving end, a transmitting-end MAC address that serves as the address information of a transmitting end, a command that describes a parameter specific to the command, an error detection code CRC that is attached as required and that indicates an error up to this point, priority-utilization-period information that conveys a request for a priority-utilization-period communication according to the present invention, and an error detection code CRC of the entire frame.

Since the frame structures of the RTS command, the CTS command, the data frame, and the ACK are analogous to those shown in FIGS. 15 to 18, respectively, the descriptions thereof are omitted here.

Figure 28:
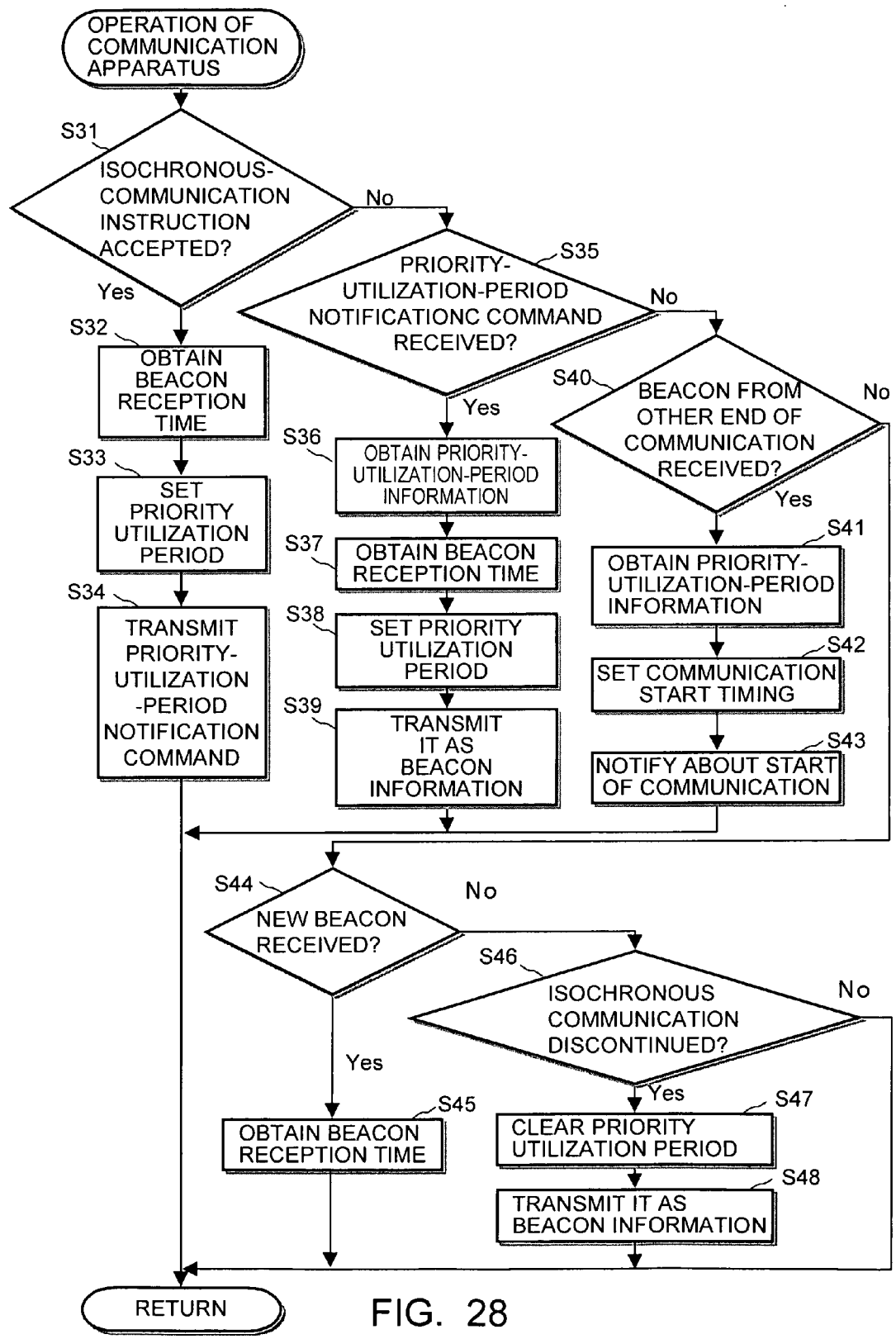
FIG. 28 is a flow chart showing processing procedures for a wireless communication apparatus to set and clear a priority utilization period in the ad-hoc network according to the present invention.

FIG. 28 shows, in a flow chart form, processing procedures for a wireless communication apparatus to set and clear a priority utilization period in the ad-hoc network according to this embodiment.

When an isochronous communication instruction is accepted from an application (not shown) of equipment connected with the communication apparatus via the interface 101 (step S31), the central controller 103 analyzes a parameter described in the isochronous communication instruction, and obtains beacon-reception-time information from a communication apparatus that is located in the vicinity, based on neighboring-communication-apparatus information stored in the information storage 113 (step S32).

While the parameter described in the isochronous communication instruction is analyzed, a priority utilization period is set so that the priority utilization period does not overlap the reception time (step S33). A priority-utilization-period notification command is transmitted to a communication apparatus that serves as a receiving end (step S34), and the series of processing exits.

On the other hand, when the received command is a priority-utilization-period notification command (step S35), the control-signal analyzer 109 analyzes the command and obtains priority-utilization-period information described in the command (step S36). The control-signal analyzer 109 obtains beacon-reception-time information from a communication apparatus located in the vicinity, based on neighboring-communication-apparatus information stored in the information storage 113 (step S37).

A priority utilization period is set so that the priority utilization period does not overlap the beacon reception time (step S38). Further, the state of the setting is constructed as one piece of beacon information and is transmitted to neighboring communication apparatuses (step S39), and the series of processing exits.

When a beacon from the other end of communication is received (step S40), the beacon analyzer 111 analyzes the beacon and obtains priority-utilization-period information described therein (step S41). The communication start timing is set at the timing controller 105 (step S42). Further, as required, a notification indicating the start of communication is issued to the application of equipment connected (step S43), and the series of processing exits.

Alternatively, when the result of analysis of the received beacon by the beacon analyzer 111 indicates that the beacon has been transmitted from another new communication apparatus (step S44), the beacon-reception-time information is stored in the neighboring-communication-apparatus information in the information storage 113 (step S45), and the series of processing exits.

When the central controller 103 determines that an isochronous communication has been discontinued over a predetermined period of time (step S46), the setting of the priority utilization period that has been set is cleared (step S47). Further, the state of the setting is constructed as one piece of beacon information, which is then transmitted to the neighboring communication apparatuses (step S48). The series of processing then exits.

Figure 29:
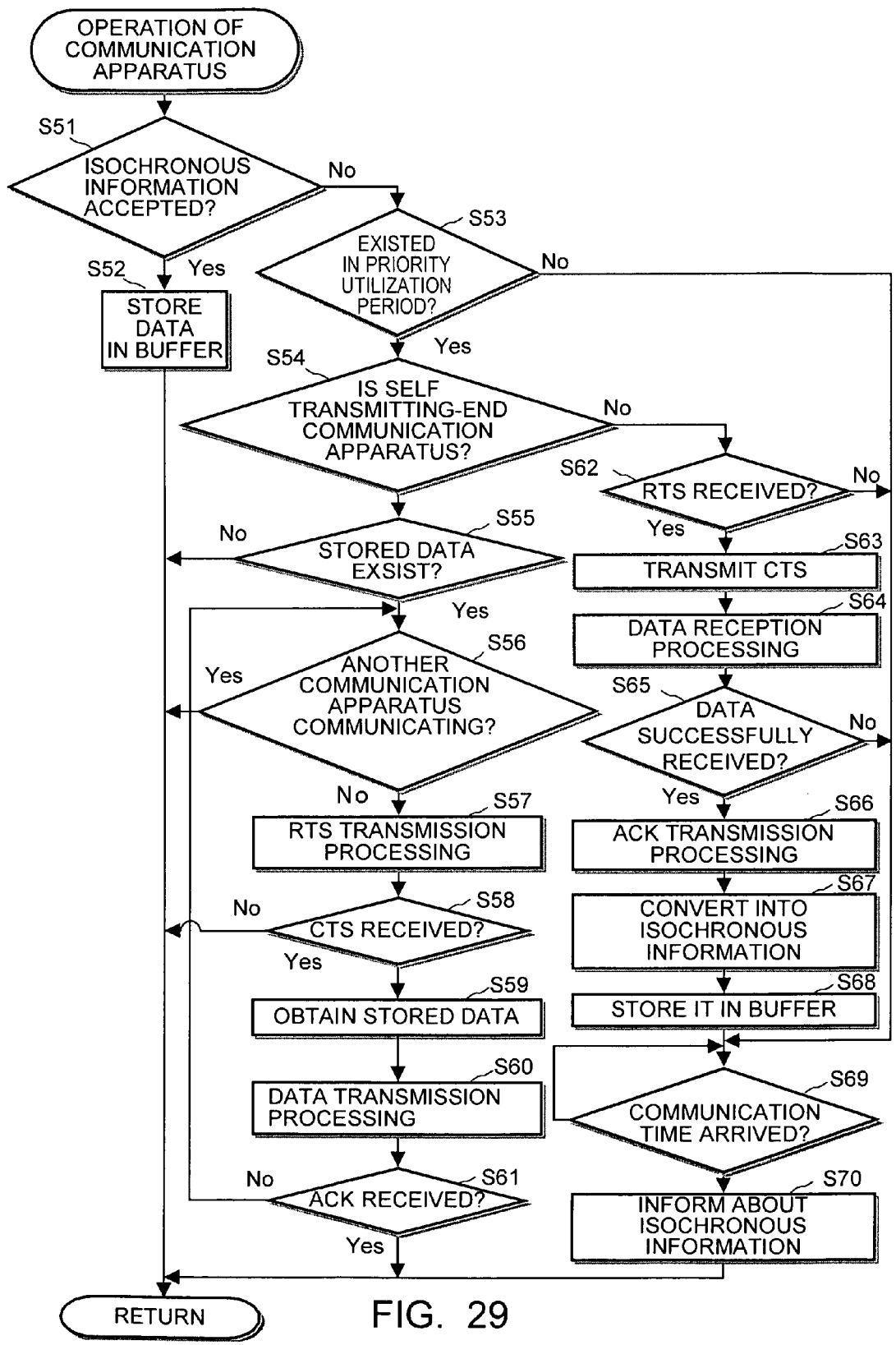
FIG. 29 is a flow chart showing processing procedures for a wireless communication apparatus to perform isochronous communication in the ad-hoc network according to the present invention.

FIG. 29 shows, in a flow chart form, processing procedures for a wireless communication apparatus to perform isochronous communication in the ad-hoc network according to this embodiment.

When isochronous communication information is accepted from an application (not shown) of equipment connected with the communication apparatus via the interface 101 (step S51), accepted data is sequentially stored in the data buffer 102 (step S52), and the series of processing exits.

Further, the central controller 103 checks whether or not the current time is within a priority utilization period (step S53). When the current time is within a priority utilization period and the self is a transmitting-end communication apparatus (step S54), a determination is made as to whether or not data stored in the data buffer 102 exists (step S55). When no data exists, the processing exits. When data exists, a determination is made as to whether or not another communication apparatus is currently communicating (step S56). Unless another communication apparatus is not communicating, processing for transmitting a transmission request RTS is performed via the control-signal generator 108 (step S57).

Thereafter, a determination is made as to whether or not the control-information analyzer 109 has received a reception preparation completion CTS (step S58). When a reception preparation completion CTS has not been received, the processing exits. When a reception preparation completion CTS has been received, stored data is obtained from the data buffer 102 (step S59). Predetermined header information is added and then data transmission processing is performed (step S60).

Further, when a reception acknowledgement ACK is received (step S61), the series of processing exits. On the other hand, when an ACK has not been received, the process returns to step S56, and re-transmission processing is performed after it is determined that communication is possible on a transmission path.

When it is determined in step S54 that the self is not a transmitting-end communication apparatus, a determination is made as to whether or not the control-signal analyzer 109 has received a transmission request RTS (step S62). When an RTS is received, processing for transmitting a reception preparation completion CTS is performed via the control-signal generator 108 (step S63). Thereafter, processing for receiving data is performed (step S64).

When the data was successively received (step S65), reception acknowledgement information ACK is generated and is transmitted to the transmitting end (step S66). The received data is decomposed into isochronous information (step S67) and the isochronous information is stored in the data buffer 102 (step S68).

When isochronous communication time including a predetermined delay time arrives (step S69), the equipment connected via the interface 101 is informed of the isochronous information, i.e., the data accumulated in the data buffer 102 (step S70), and the series of processing exits.

When it is determined in step S53 that the current time is not within a priority utilization period, when it is determined in step S62 that a transmission request RTS is not received, and when it is determined that the data is not successively received in step S65, the process proceeds to step S69. In step S69, when isochronous communication time arrives, the equipment connected via the interface 101 is notified of the isochronous information (step S70), and the series of processing exits.

Supplement

The present invention has been described above in detail with reference to the particular embodiments. However, it is obvious to those skilled in the art that a modification and substation can be made to the embodiments within the substance of the present invention. The present invention has been disclosed by way of example and should not be construed as limiting. The scope of the invention is to be determined by taking the claims into consideration.

INDUSTRIAL APPLICABILITY

The present invention can provide a superior wireless communication system, a wireless communication apparatus, a wireless communication method, and a computer program which can perform data transmission with a guaranteed bandwidth in an ad-hoc communication environment.

The present invention can also provide a superior wireless communication system, a wireless communication apparatus, a wireless communication method, and a computer program which can efficiently transmit data having a real-time characteristic, such as AV content, through isochronous communication in an ad-hoc communication environment.

According to the present invention, each wireless communication uses beacon information to notify of timing that the self utilizes for a band-reservation communication. Thus, it is possible to achieve band-reservation communication without arranging a controlling station.

Further, a wireless communication apparatus that serves as a receiving end of information notifies of the neighbors about the presence of a band-reservation communication. By doing so, a wireless communication apparatus that exists at a position to be a hidden terminal from a transmitting-end communication apparatus can be efficiently notified in advance that a communication is performed.

Also, a beacon is used to inform of timing used for a band-reservation communication. By doing so, any large of number of wireless communication apparatuses can be notified in advance that a band-reservation communication is performed.

Further, a receiving-end communication apparatus creates timing utilized for a band-reservation communication in a pseudo manner to have the same state as timing of transmitting the own beacon and notifies of the timing utilized for the band-reservation communication. By doing so, a wireless communication apparatus that exists in a region to be a hidden terminal viewed from a transmitting-end communication apparatus can also be notified that a band-reservation communication is performed.

Further, setting timing used for communication to have an interval at which a beacon period is divided by a predetermined timing can improve the spatial repeated-use efficiency.

According to the present invention, each wireless communication apparatus sets a period (timing) that can be utilized by the self with priority so as to perform an isochronous communication. This can achieve isochronous communication without the provision of a controlling station.

In this case, there is no need to occupy time that is periodically defined for a specific isochronous communication. When a predetermined isochronous communication is finished, a period (timing) utilizable with priority is temporarily released with priority, so as to appropriately allow other communication apparatuses to perform another communication with each other, thereby improving a throughput.

When communication between other wireless communication apparatuses is performed in a period (timing) usable with priority, a predetermined isochronous communication is started after the end of the communication. This can achieve an isochronous communication that coexists with another communication. While a slight delay occurs in this case, it is possible to achieve a real-time communication with an application of a receiving end.

According to the present invention, a period (timing) usable with priority is set at timing that does not prevent the transmission of a beacon signal from another communication apparatus that exists in the own neighbor. This allows an isochronous communication while maintaining a coexistent relationship with neighboring communication apparatuses.

Further, each wireless communication apparatus mutually sets a period (timing) utilizable with priority. This can achieve communication with an enhanced real-time characteristic, without setting a period (timing) utilizable with priority which completely matches a cycle at which an application performs an isochronous communication.

The invention claimed is:

1. A wireless communication system that forms a network without a specific controlling station, the wireless communication system comprising:
a transmitting-side or receiving-side wireless communication apparatus that (a) sets a priority utilization period, (b) provides, within its own communication range during a time following the setting of the priority utilization period, notification of the priority utilization period, and (c) performs plural communications, with priority, utilizing the priority utilization period.

2. The wireless communication system according to claim 1, wherein the transmitting-side or receiving-side communication apparatus temporarily delays a start of performing communication and performs transmission based on a priority utilization after an end of another communication if the another communication is being performed when the priority utilization period begins.

3. The wireless communication system according to claim 1, wherein the transmitting-side or receiving-side communication apparatus describes information regarding the priority utilization period as beacon information transmitted for each predetermined frame period.

4. The wireless communication system according to claim 1, wherein in a period in which no communication apparatus of the network has set a priority utilization period, each communication apparatus of the network performs random access based on a collision avoidance operation that starts transmission after detecting that no transmission is performed from another communication apparatus.

5. The wireless communication system according to claim 1, wherein before the priority utilization period ends, when the transmitting-side or receiving-side communication apparatus has completed the communication or has not performed the communication, other communication apparatuses of the network perform arbitrary communication with each other during the priority utilization period.

6. The wireless communication system according to claim 1, wherein each communication apparatus of the network collects beacon information from its neighboring communication apparatuses, obtains information regarding priority utilization periods of the neighboring communication apparatuses, and does not set, as its own priority utilization period, a period that is set as a priority utilization period by any of the neighboring communication apparatuses.

7. The wireless communication system according to claim 1, wherein the transmitting-side or receiving side communication apparatus collects beacon information from its neighboring communication apparatuses, obtains information regarding priority utilization periods of the neighboring communication apparatuses, and sets, as its own priority utilization period, a period that is not set as a priority utilization period by the neighboring communication apparatuses.

8. The wireless communication system according to claim 1, wherein the transmitting-side or receiving-side communication apparatus obtains information regarding a priority utilization period from another communication apparatus at another end of a communication and sets, as its own priority utilization period, a period that is not set as a priority utilization period by the another communication apparatus or its neighbors.

9. A wireless communication apparatus that performs a wireless communication operation without a specific controlling station, the wireless communication apparatus comprising:
a communication unit configured to transmit/receive a wireless signal within its own communication range;
a priority-utilization-period setting unit configured to set a priority utilization period and to provide, within the own communication range during a time following the setting of the priority utilization period, notification of the priority utilization period; and
a communication controlling unit configured to perform plural communications, with priority, in response to an arrival of the priority utilization period.

10. The wireless communication apparatus according to claim 9, wherein the priority-utilization-period setting unit describes information regarding the priority utilization period in a beacon transmitted for each predetermined frame period and transmits the beacon to provide the notification of, within its own communication range, the setting of the priority utilization period.

11. The wireless communication apparatus according to claim 9, wherein the communication controlling unit performs random access based on a collision avoidance operation that starts transmission after detecting that no transmission is performed from another communication apparatus, as required, during a period in which no priority utilization is set.

12. The wireless communication apparatus according to claim 9, wherein, before the priority utilization period set by the priority-utilization-period setting unit ends, when communication utilizing a band with priority has finished or has not been performed, arbitrary communication between other wireless communication apparatuses is permitted during the priority utilization period.

13. The wireless communication apparatus according to claim 9, wherein the communication controlling unit temporarily delays a start of communication in the priority utilization period and performs transmission based on the priority utilization period after an end of another communication, if the another communication is performed at a time when the priority utilization period arrives.

14. The wireless communication apparatus according to claim 9, wherein the priority-utilization-period setting unit collects beacon information from neighboring wireless communication apparatuses, obtains information regarding priority utilization periods of the neighboring wireless communication apparatuses, and does not set, as its own priority utilization period, a period that is set as priority utilization periods by the neighboring wireless communication apparatuses.

15. The wireless communication apparatus according to claim 9, wherein the priority-utilization-period setting unit collects beacon information from neighboring wireless communication apparatuses, obtains information regarding priority utilization periods of the neighboring wireless communication apparatuses, and sets, as its own priority utilization period, a period that is not set as priority utilization periods by the neighboring wireless communication apparatuses.

16. The wireless communication apparatus according to claim 9, wherein the priority-utilization-period setting unit obtains information regarding a further priority utilization period from another wireless communication apparatus at another end of a communication, and sets a period that is not set as the further priority utilization periods by the another wireless communication apparatus or its neighbors as its own priority utilization period.

17. A wireless communication method for a wireless communication apparatus to perform a wireless communication operation without a specific controlling station, the wireless communication method comprising:
setting a priority utilization period;
providing, within its own communication range during a time following the setting of the priority utilization period, notification of the priority utilization period; and
performing plural communications, with priority, in response to an arrival of the priority utilization period.

18. The wireless communication method according to claim 17, wherein information regarding the priority utilization period is described in a beacon transmitted for each predetermined frame period to provide the notification of, within its own communication range, the setting of the priority utilization period.

19. The wireless communication method according to claim 17, wherein during a period in which any communication does not set a priority utilization, random access based on a collision avoidance operation is performed as required which starts transmission after detecting that no transmission is performed from another communication apparatus.

20. The wireless communication method according to claim 17, wherein before the priority utilization period ends, when communication utilizing a bandwidth with priority has finished or has not been performed, arbitrary communication between other communication apparatuses is permitted during the priority utilization period.

21. The wireless communication method according to claim 17, wherein the start of communication in the priority utilization period is temporarily delayed and transmission based on the priority utilization period is performed after an end of another communication if the another communication is performed at a time when the priority utilization period arrives.

22. The wireless communication method according to claim 17, wherein in each communication apparatus, beacon information is collected from neighboring communication apparatuses, information regarding priority utilization periods of the neighboring communication apparatuses is obtained, and a period that is set as the priority utilization periods by the neighboring communication apparatuses is not set as its own priority utilization period.

23. The wireless communication method according to claim 17, wherein beacon information is collected from neighboring communication apparatus, information regarding priority utilization periods of the neighboring communication apparatuses is obtained, and a period that is not set as priority utilization periods by the neighboring communication apparatuses is set as its own priority utilization period.

24. The wireless communication method according to claim 17, wherein information regarding a further priority utilization period is obtained from another communication apparatus at another end of a communication, and a period that is not set as the further priority utilization period by the another communication apparatus or its neighbors is set to its own priority utilization period.

25. A processor having computer program instructions for carrying out a method of performing a wireless communication operation without a specific controlling station, the method comprising:
using the processor to carry out the following steps:
setting a priority utilization period;
providing, within its own communication range during a time following the setting of the priority utilization period, notification of the priority utilization period; and
performing plural communications, with priority, in response to an arrival of the priority utilization period.

* * * * *

UNITED STATES PATENT AND TRADEMARK OFFICE
CERTIFICATE OF CORRECTION

| | | |
|---|---|---|
| PATENT NO. | : 8,085,744 B2 | Page 1 of 1 |
| APPLICATION NO. | : 12/150492 | |
| DATED | : December 27, 2011 | |
| INVENTOR(S) | : Shigeru Sugaya, Shin Saito and Kazuyuki Sakoda | |

It is certified that error appears in the above-identified patent and that said Letters Patent is hereby corrected as shown below:

Title Page, Item (54) and at Column 1, line 4, the second-to-last word of the title, should read --COMPUTER-- not "COMPUTE".

Signed and Sealed this
Sixth Day of March, 2012

David J. Kappos
*Director of the United States Patent and Trademark Office*